United States Patent [19]

Hattori

[11] Patent Number: 5,778,340
[45] Date of Patent: Jul. 7, 1998

[54] ADAPTING INPUT SPEECH AND REFERENCE PATTERNS FOR CHANGING SPEAKER AND ENVIRONMENT

[75] Inventor: Hiroaki Hattori, Tokyo, Japan

[73] Assignee: NEC Corporation, Tokyo, Japan

[21] Appl. No.: 524,807

[22] Filed: Sep. 7, 1995

[30] Foreign Application Priority Data

Sep. 8, 1994 [JP] Japan .................................. 6-214836

[51] Int. Cl.⁶ ......................................... G10L 5/06
[52] U.S. Cl. ............................. 704/244; 704/252
[58] Field of Search .................. 395/2.53, 2.61, 395/2.31, 2.43, 2.47, 2.52, 2.6, 2.54, 2.64, 2.42, 2.4, 2.48, 2.33; 704/265

[56] References Cited

U.S. PATENT DOCUMENTS

| | | | |
|---|---|---|---|
| 4,843,562 | 6/1989 | Kenyon et al. | 364/487 |
| 4,941,178 | 7/1990 | Chuang | 704/252 |
| 5,040,213 | 8/1991 | Yasuda et al. | 395/2.53 |
| 5,127,055 | 6/1992 | Larkey | 395/2.53 |
| 5,150,449 | 9/1992 | Yoshida et al. | 395/2.41 |
| 5,278,942 | 1/1994 | Bahl et al. | 704/200 |

FOREIGN PATENT DOCUMENTS

| | | |
|---|---|---|
| 0 342 630 | 11/1989 | European Pat. Off. |
| 0 469 577 | 2/1992 | European Pat. Off. |

OTHER PUBLICATIONS

Shikano et al., "Speaker Adaption Through Vector Quantization", Computer Science Department Carnegie Mellon University, pp. 2643-2646, 1986.

Alejandro Acero, "Acoustical and Environmental Robustness in Automatic Speech Recognition", Kluwer Academic Publishers, 0-7923-9234-1, 1993.

Takagi et al., "Speech Recognition with Environment Adaption function based on Spectrum Image", Proc. The Acoustical Society of Japan, pp. 173-174, 1994.

M. Nishimura et al., "Speaker Adaptation Method for HMM-Based Speech Recognition", International Conf. on Acoustics, Speech & Sig. Proc. 1988, vol. 1, Apr. 11-14 1988, pp. 207-210.

F.R. McInnes, M.A. Jack, and J. Laver, "Template Adaptation in an Isolated Word-Recognition System," IEE Proceedings, vol. 136, Pt I, No. 2, Apr. 1989, 119-126.

Primary Examiner—David R. Hudspeth
Assistant Examiner—Donald L. Storm
Attorney, Agent, or Firm—Foley & Lardner

[57] ABSTRACT

Speech input is converted into a feature vector series, which is held as an input pattern in an input pattern memory and which is also fed to a preliminary recognizer. A reference pattern memory stores reference patterns of recognition subject words. The preliminary recognizer executes preliminary recognition by calculating similarity measures between the input pattern and the reference patterns stored in a reference pattern memory, and obtains top N candidates using the calculated similarity measures. A reference pattern adapter executes adaptation of the reference patterns based on the reference patterns, the input pattern, the top N candidates, and newly stores the adapted reference patterns in the reference pattern memory. A final recognizer then executes speech recognition of the input pattern by using the newly-stored reference patterns corresponding to the top N candidates.

17 Claims, 15 Drawing Sheets

1

ADAPTING INPUT SPEECH AND REFERENCE PATTERNS FOR CHANGING SPEAKER AND ENVIRONMENT

BACKGROUND OF THE INVENTION

The present invention relates to a speech recognition system having an adaptation function.

Heretofore, there have been proposed an adaptation systems which can adapt speakers and environments for high recognition rate speech recognizer of non-particular speakers in various environments. For example, K. Shikano, K. F. Lee and R. Reddy, "Speaker Adaptation Through Vector Quantization", Proc. ICASSP86, pp. 2643-2646 (1986) (hereinafter referred to as Method 1) proposes a method of speaker adaptation by obtaining a histogram between speaker's and reference speaker's codebooks from the result of time axis correspondence between a vector quantized input pattern and a reference pattern. Also, Alejandro Acero, "Acoustical and Environmental Robustness in Automatic Speech Recognition", Kluwer Academic Publishers, ISBN 0-7923-9234-1 (1993) (hereinafter referred to as Method 2) discloses an adaptation method of different input environments by obtaining adaptation parameters concerning transmission distortions in spectrum region and additive noise through the likelihood estimation. In these systems, it is necessary to execute the adaptation with a certain volume of speech produced as the speech data for the adaptation prior to recognition with a new speaker or in new environment.

Generally, the speech of the same speaker is affected by his or her physical condition, mental status and so forth. In addition, in the speech recognition through a telephone line, line characteristics and the level of background noise vary call by call. Therefore it is desirable in the adaptation of the speaker and environment to use the input speech itself as the adaptation data. In methods 1 and 2 noted above, however, the adaptation using such recognition subject is difficult because of the facts that certain speech data is necessary for the adaptation and that the adaptation process takes a certain period of time.

As a system for coping with this difficulty, Takagi et al. "Speech recognition with environment adaptation function based on spectrum image", Proc. the Acoustical Society of Japan, pp. 173-174, (1994, 3), proposes an adaptation system using recognition subject words themselves (hereinafter referred to as method 3). In method 3, difference in environments is extracted and adapted as the difference between the mean spectrum in a speech period and the mean spectrum in a noise period, so that it is possible to obtain stable adaptation even with a word without speech content information.

An operation of the adaptation and recognition in the prior art will now be described with reference to FIG. 8.

Speech waveform supplied to an input terminal 810 is converted in an analyzer 820 into a feature vector series. The feature vector series thus obtained is supplied via a signal line 821 to an input pattern memory 830 and stored therein as an input pattern. At the time of executing the adaptation, a switch 840 connects a signal line 831 to a signal line 842. A reference pattern adapter 870 executes the adaptation after reading out the input pattern through the signal line 842 and a reference pattern through a signal line 851. The resultant adapted reference pattern is stored in a reference pattern memory 850. At the time of recognition, the switch 840 connects the signal line 831 to a signal line 841. A recognizor 880 develops similarity measure through matching of the input pattern and the reference pattern which are read out through the signal line 841 and a signal line 8521 respectively, the recognition result being output to an output terminal 890.

Even in method 3, however, an adapting process time and a recognizing process time are necessary after completion of the speech input. This means that it requires relative time until the recognition result is obtained, degrading the response characteristic.

SUMMARY OF THE INVENTION

It is therefore an object of the present invention to provide a speech recognition system with an adaptation system using speech to be recognized itself, which allows a high recognition rate without degrading the response characteristic of the system even in case when the environment or speaker is different from that of the reference pattern.

According to the present invention, adaptation is made by using speech to be recognized (recognition subject speech) to ensure sufficient response characteristic while obtaining a high recognition rate. The result of adaptation made by using previous input speech is used for preliminary recognition of the speech to be recognized, thereby making preliminary selection of words, while making adaptation by using the speech to be recognized. With respect to the preliminarily selected words, regular recognition is made.

The operation according to the present invention comprises the following steps:

Step 1. Initial reference pattern are set.

Step 2. Input speech is analyzed to obtain an input pattern.

Step 3. Preliminary recognition for the input pattern is made by using reference patterns of all recognition subject words (the number of words being M), thus obtaining top N candidates.

Step 4. Reference pattern adaptation is made by using the input pattern.

Step 5. Using the adapted reference patterns, the input pattern is recognized once again with the top N candidates in the preliminary recognition result used as the recognition subject words, the result being output as recognition result.

Step 6. Step 2 and following steps are repeated.

Usually, up to the step 3 an analysis process and a speech recognition process may be executed in synchronism to the input speech. The adaptation process in the step 4 and the re-recognition in the step 5 have effects on the response characteristic of the speech recognition system. The amount of process in the step 4 varies with the adaptation system used; for example, the process amount may be very small in case of using method 3.

In this system, as the recognition subject words in the step 5N preliminarily selected words are used, and thus by denoting the number of the recognition subject words by N the process amount is N/N. The factor of reduction of the process amount depends on the accuracy of the preliminary selection. The preliminary selection is made by using patterns that have been adapted using input speech until the preceding speech. It is thus possible to expect highly accurate preliminary selection even in case when the background noise and line characteristics are different from those at the time of the training.

In the system, which is, for instance, a real time speech recognition system with 1,000 recognition words, if the number of the preliminarily selected words is 10, the process amount in the step 5 is 1/100 of the amount in the step 3. Thus, in a speech recognition system in which the step 3 is capable of real time operation, 2-second input speech can be re-recognized in 20 msec. This process time gives rise to no problem in practice.

The adaptation that can be utilized in this system is not limited to System 3, in which reference patterns are adapted for input environments, but various other adaptation systems are conceivable as well. For example, it is possible to use a system of adapting an input pattern to an environment which incorporates the training of reference patterns or a system of adapting both of reference and input patterns. Further, regarding the utilization of the result of preliminary selection in the adaptation, while the method 3 uses first candidates, it is possible as well to use a plurality of candidates or use no preliminary selection result. Further, it is possible to make adaptation afresh by utilizing the higher accuracy result of the regular recognition. Other objects and features will be clarified from the following description with reference to attached drawings.

DETAILED DESCRIPTION OF THE PREFERRED EMBODIMENTS

Figure 1:
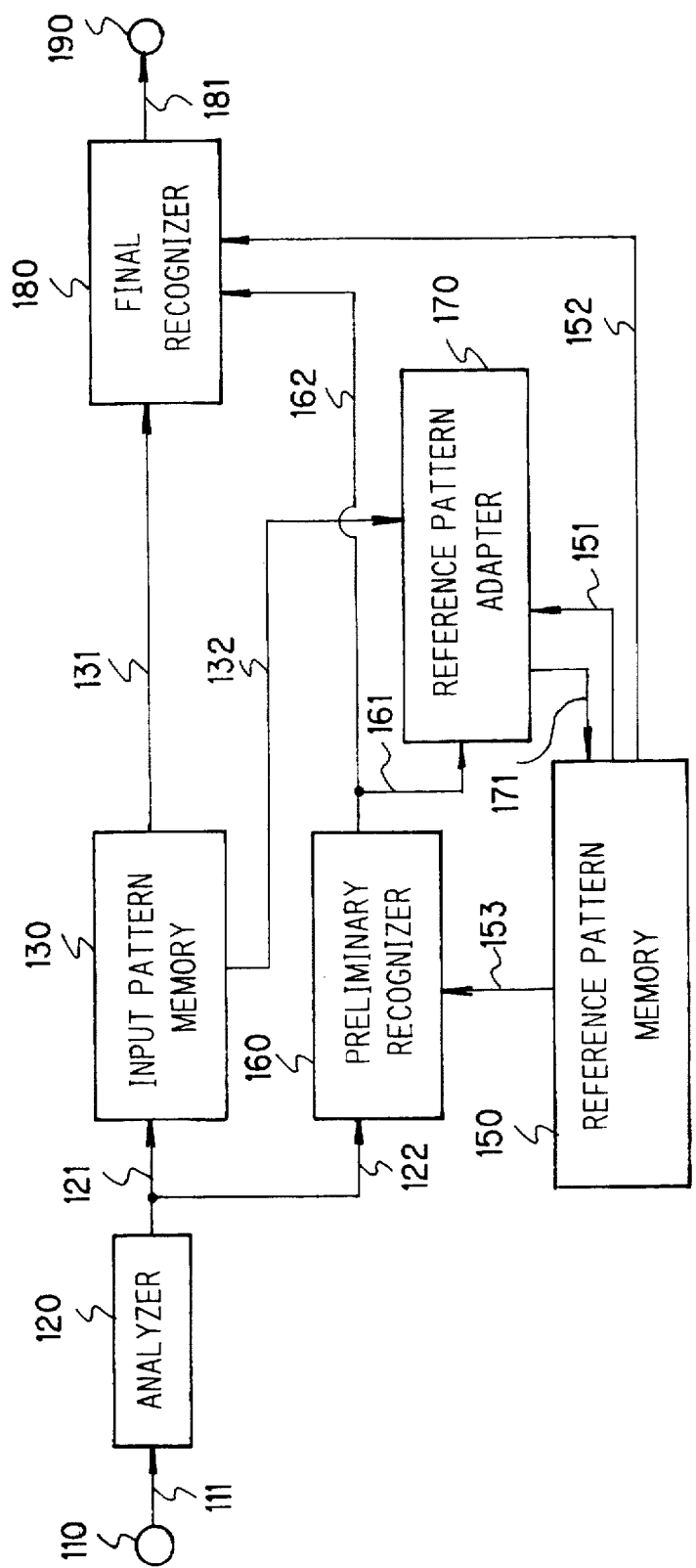
FIG. 1 shows a first embodiment of the speech recognizer according to the present invention.
Figure 9:
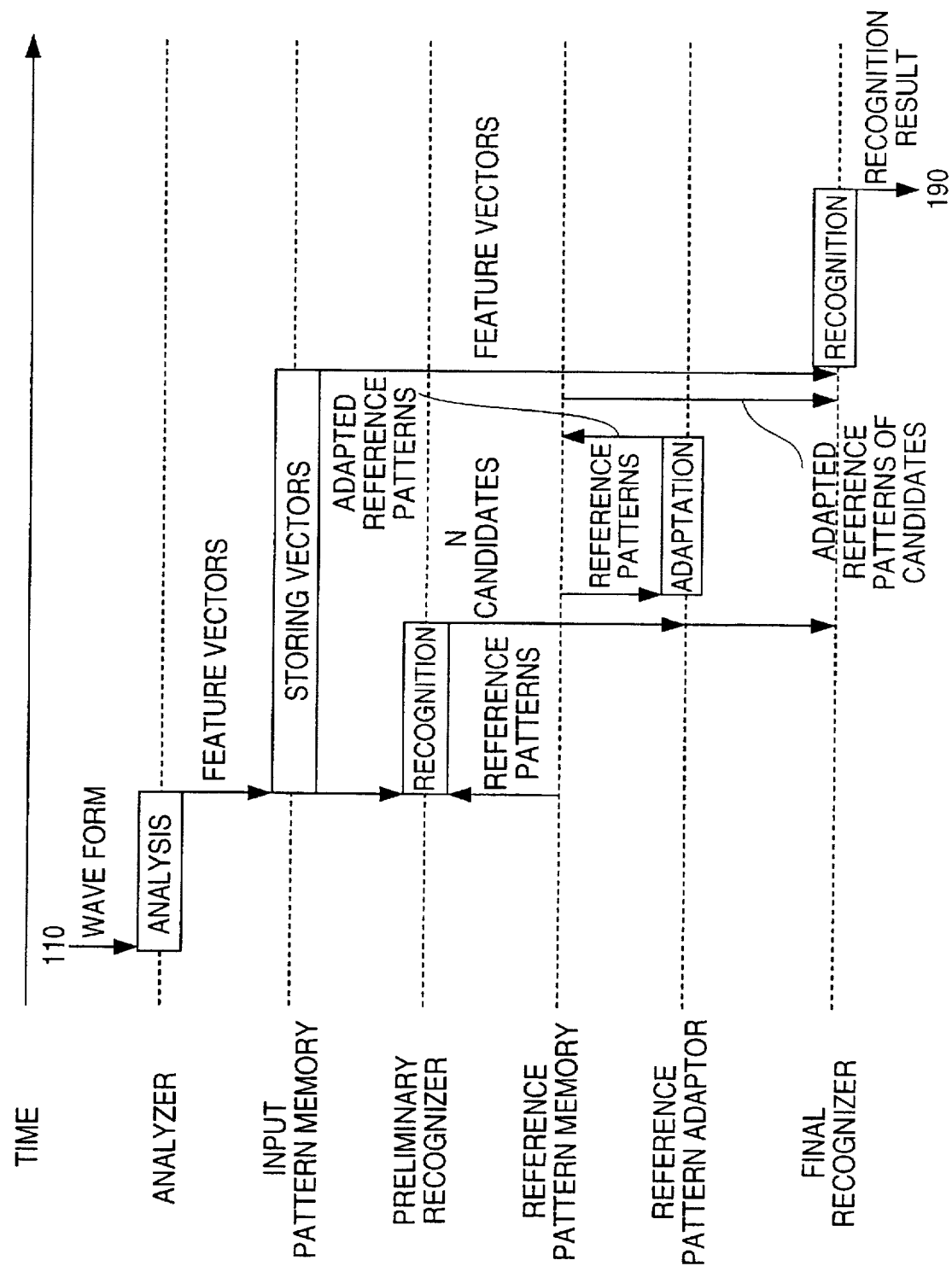
FIGS. 9–15 respectively show a timing sequence of the first through seventh embodiments.

FIG. 1 shows in block diagram form a first embodiment of the present invention, and FIG. 9 shows a timing sequence of the first embodiment. Speech waveform $(X_1, \ldots, X_N)$ supplied to an input terminal 110 is converted by an analyzer 120 into feature vector series. As the feature vectors may be used cepstrums or LPC coefficients obtainable through FFT analysis, linear prediction analysis, etc. or time variations of these parameters. The feature vectors thus obtained are supplied via a signal line 121 to an input pattern memory 130 and stored therein as the input pattern, and are also supplied via a signal line 122 to a preliminary recognizer 160.

The preliminary recognizer 160 executes a preliminary recognition based on the feature vectors supplied through a signal line 122 and all reference patterns read out from a reference pattern memory 150 through a signal line 153 to obtain top N candidates in the order of higher similarities.

A reference pattern adapter 170 executes the adaptation based on the input pattern read out through a signal line 132, top N candidates as a result of the preliminary recognition supplied through a signal line 161 and reference patterns read out through a signal line 151. Thus adapted reference patterns are stored in a reference pattern memory 150.

In case of using method 3, for instance, a time axis correspondence between the top candidate reference pattern and the input pattern is executed to obtain mean spectrum $S_v$, in a speech period of the input pattern, mean spectrum $N_v$, in a noise period of the input pattern, mean spectrum $S_w$, in a speech period of the reference pattern and mean spectrum $N_w$ in a noise period of the reference pattern. Using these spectra, the spectra S of all the reference patterns are adapted as follows:

In the case of the reference patterns of speech as:

$$\hat{S}_k = \frac{S_{v,k} - N_{v,k}}{S_{w,k} - N_{w,k}} (S_k - N_{w,k}) + N_{v,k}$$

In the case of the reference patterns of noise as:

$$\hat{S}_k = N_{v,k}$$

where $S_k$ is the k-th frequency component of the spectra S.

Alternatively, the time axis correspondence between the top candidate reference pattern and the input pattern is executed to obtain mean feature vector $S_v$, in a speech period of the input pattern, mean feature vector $N_v$, in a noise period of the input pattern, mean feature vector $S_w$ in a speech period of the reference pattern and mean feature vector $N_w$ in a noise period of the reference pattern. Using these feature spectra, the feature spectra S of all the reference patterns are adapted as follows:

In the case of the reference patterns of speech as:

$$\hat{S} = S + S_v - S_w$$

and in the case of the reference patterns of noise as:

$$\hat{S} = S + N_v - N_w$$

While two examples of the adaptation system were given above as systems capable of utilization, they are by no means limitative, and it is possible to use various other adaptation systems as well for adapting reference patterns.

A final or second recognizer 180 obtains similarity measure through the matching process for the input pattern read out through a signal line 131, top N candidates as a result of preliminary recognition supplied through a signal line 162, and the reference patterns supplied through a signal line 152. The result recognition is output to an output terminal 190.

Figure 2:
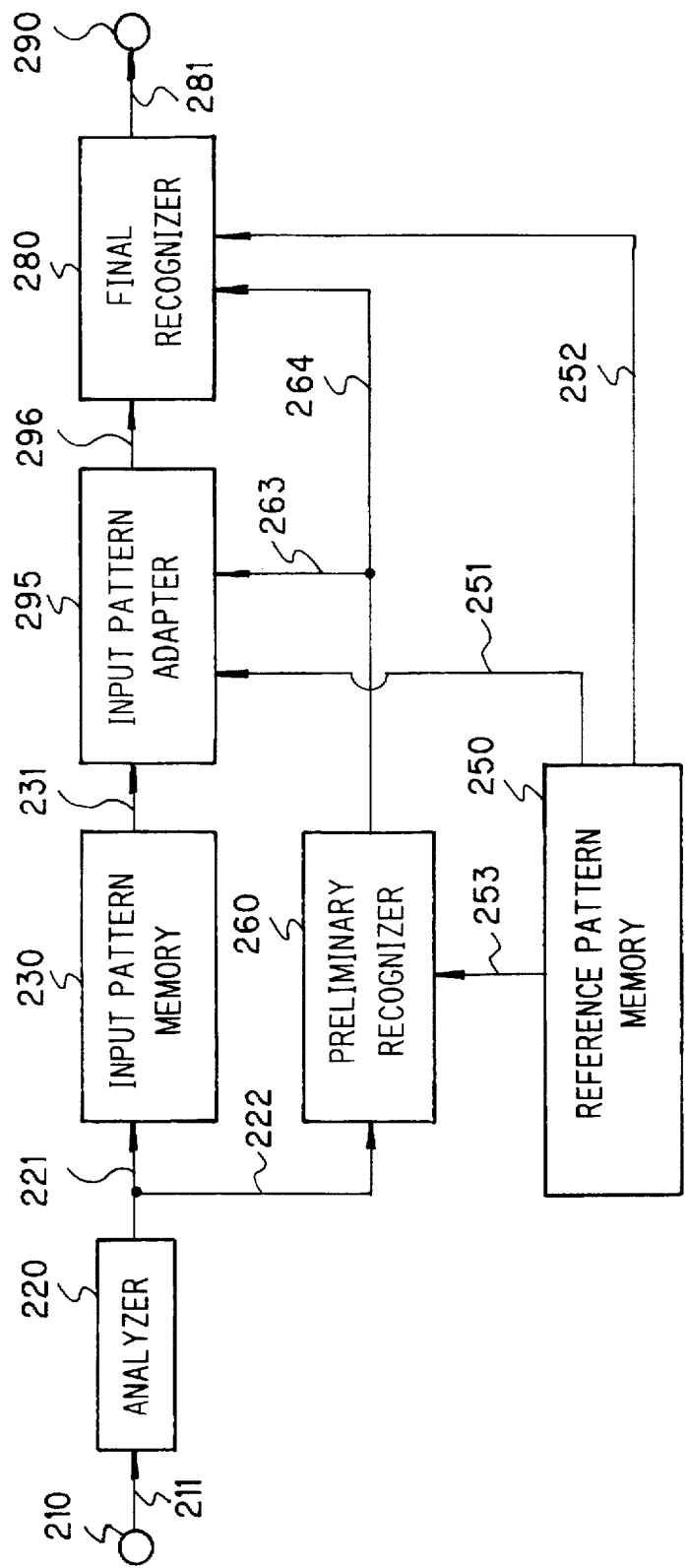
FIG. 2 shows second embodiment of the speech recognizer according to the present invention.
Figure 10:
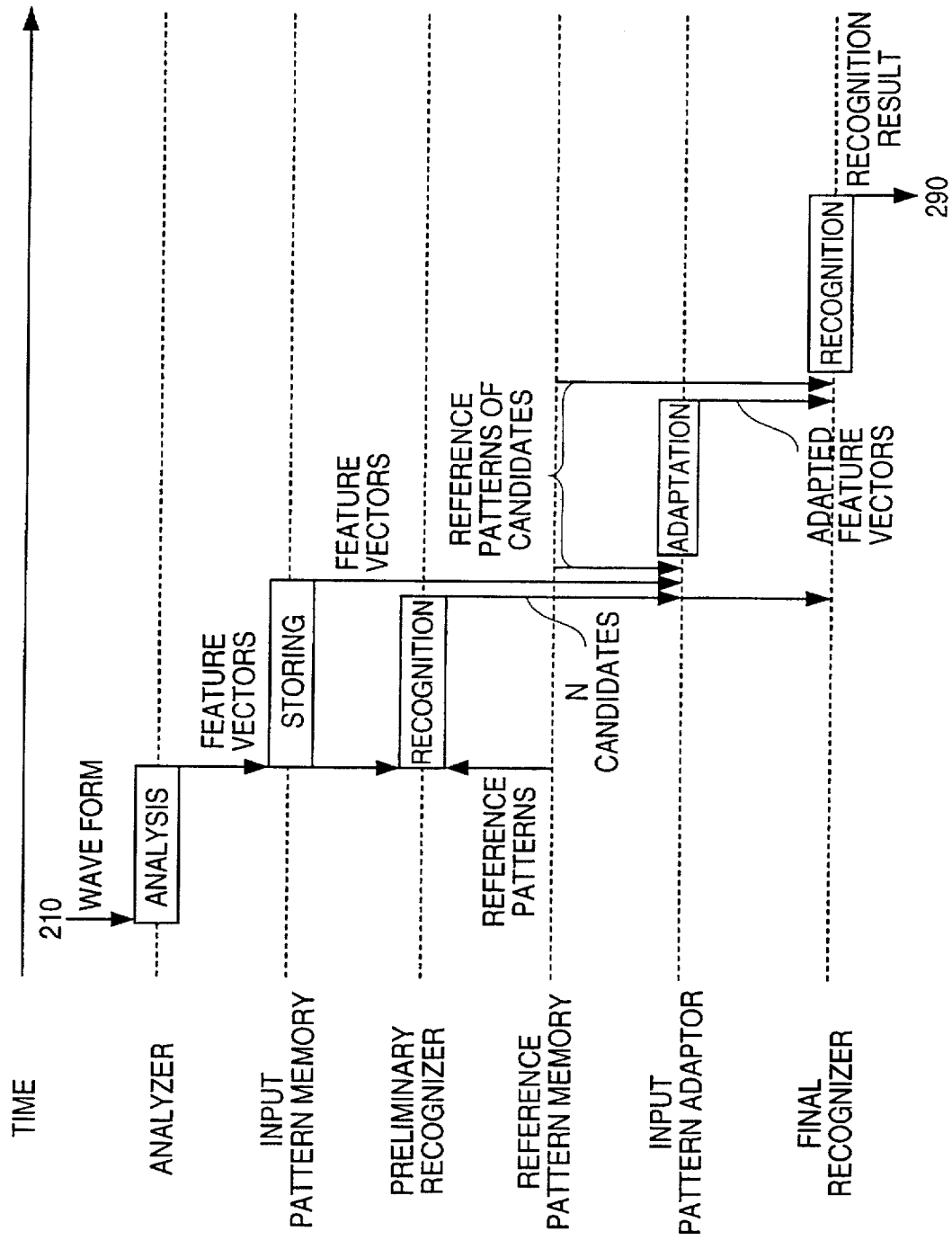

FIG. 2 shows in block diagram form a second embodiment of the present invention, and FIG. 10 shows a timing sequence of the second embodiment. Speech waveform $(X_1, \ldots, X_N)$ supplied to an input terminal 210 is converted by an analyzer 220 into feature vector series. Thus obtained feature vectors are supplied via a signal line 221 to an input pattern memory 230 and stored therein as the input pattern, and are also supplied via a signal line 232 to a preliminary recognizer 260.

The preliminary recognizer 260 executes a preliminary recognition based on the feature vectors supplied through a signal line 222 and all reference patterns read out from a reference pattern memory 250 through a signal line 253 to obtain top N candidates in the order of higher similarities.

An input pattern adapter 295 executes the adaptation of input pattern based on the input pattern through a signal line 231, top N candidates as a result of preliminary recognition through a signal line 263 and reference patterns through a signal line 251. Thus adapted input pattern is output to a signal line 296.

In case of using method 3 for the adaptation of the input pattern, for instance, a time axis correspondence between the top candidate reference pattern and the input pattern is executed to obtain mean spectrum $S_v$ in a speech period of the input pattern, mean spectrum $N_v$ in a noise period of the input pattern mean spectrum $S_w$ in a speech period of the reference pattern and mean spectrum $N_w$ in a noise period of the reference pattern. Using these spectra, the spectra S of the input pattern are adapted as follows:

$$\hat{S}_k = \frac{S_{w,k} - N_{w,k}}{S_{v,k} - N_{v,k}} (S_k - N_{v,k}) + N_{w,k}$$

where $S_k$ is the k-th frequency component of the spectra S.

Alternatively, the time axis correspondence between the top candidate reference pattern and the input pattern is executed to obtain mean feature vector $S_v$ of the input pattern and mean feature vector $S_w$ of the reference pattern. Using these feature spectra, the feature spectra S of the input pattern are adapted as follows:

$$\hat{S} = S + S_w - S_v$$

While two examples of the adaptation system were given above as systems capable of utilization, they are by no means limitative, and it is possible to use various other adaptation systems as well for adapting reference patterns.

A final or second recognizer 280 reads out the adapted input pattern through a signal line 296, top N candidates as a result of preliminary recognition supplied through a signal line 264, and the top candidate reference patterns through a signal line 252 and executes the recognition by the matching. The recognition result is output to an output terminal 290.

Figure 3:
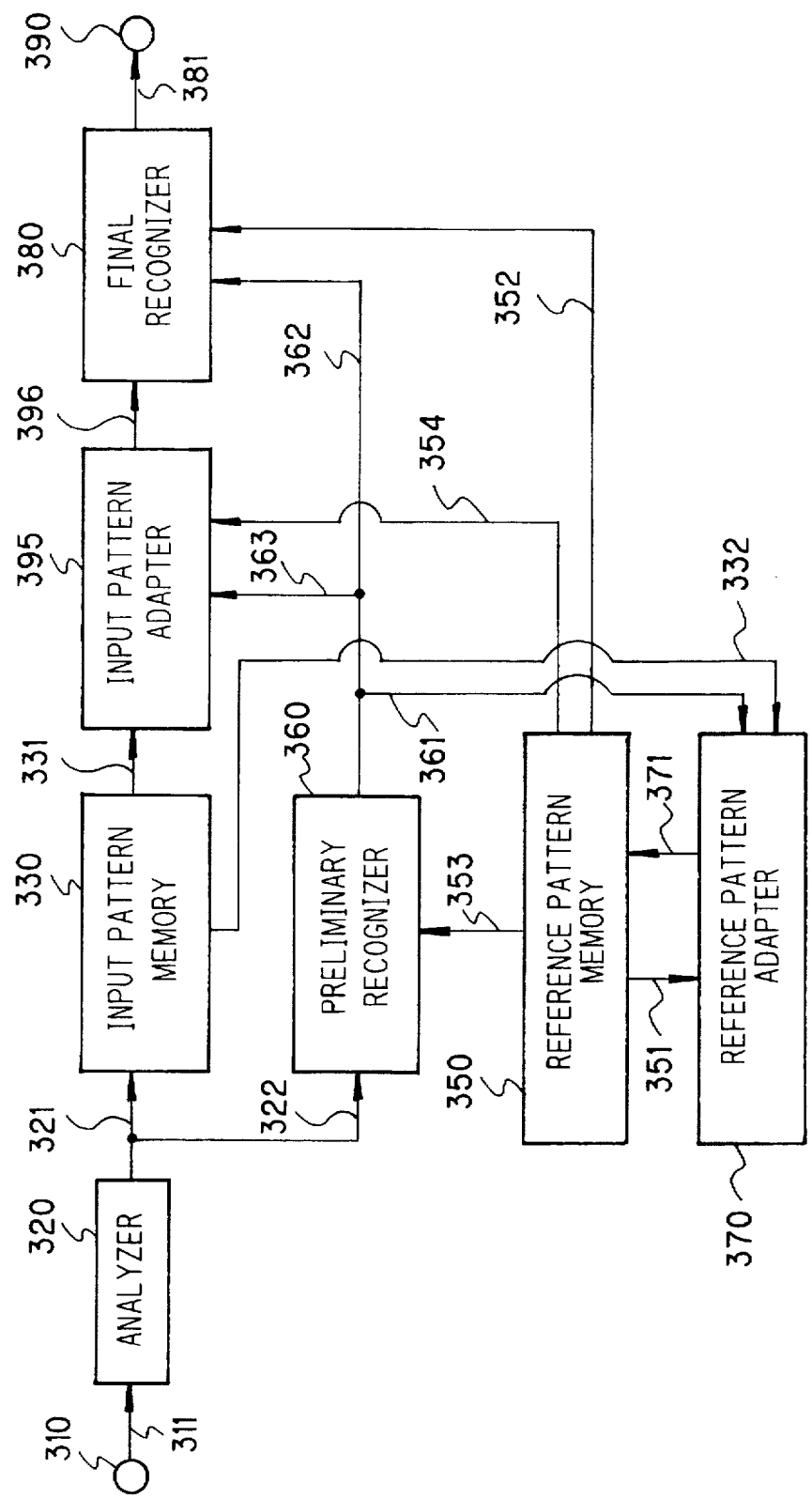
FIG. 3 shows a third embodiment of the speech recognizer according to the present invention.
Figure 11:
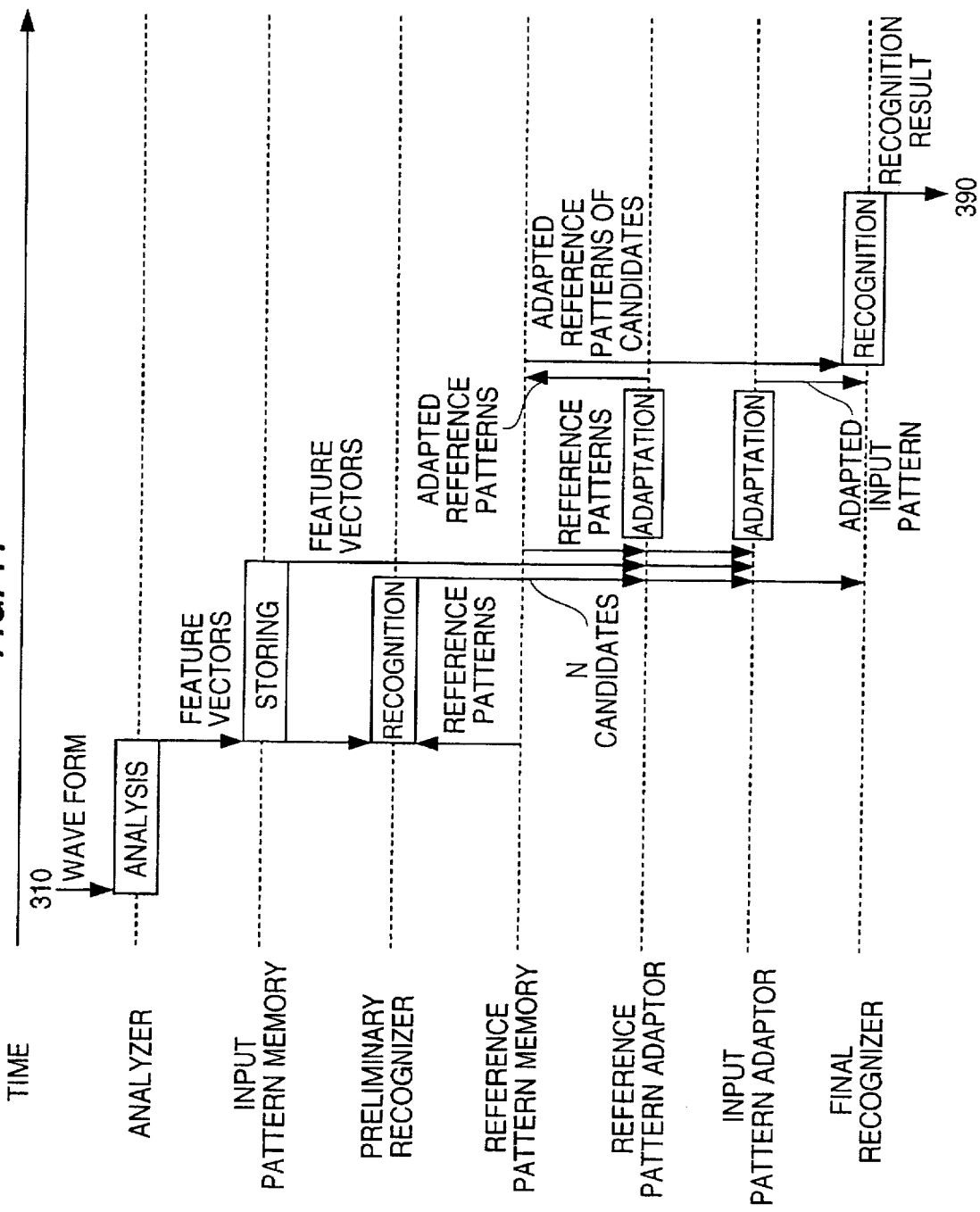

FIG. 3 shows in block diagram form a third embodiment of the present invention, and FIG. 11 shows a timing sequence of the third embodiment. Speech waveform $(X_1, \ldots, X_N)$ supplied to an input terminal 310 is converted by an analyzer 320 into feature vector series. Thus obtained feature vectors are supplied via a signal line 321 to an input pattern memory 330 and stored therein as the input pattern, and are also supplied via a signal line 322 to a preliminary recognizer 360.

The preliminary recognizer 360 executes a preliminary recognition based on the feature vectors supplied through a signal line 322 and all reference patterns read out from a reference pattern memory 350 through a signal line 353 to obtain top N candidates in the order of higher similarities.

An input pattern adapter 395 executes the adaptation of input pattern based on the input pattern through a signal line 331, top N candidates as a result of preliminary recognition through a signal line 363 and reference patterns through a signal line 354. Thus adapted input pattern is output to a signal line 396.

In case of using method 3 for the adaptation of the input pattern, for instance, a time axis correspondence between the top candidate reference pattern and the input pattern is executed to obtain mean spectrum $S_v$ in a speech period of the input pattern, mean spectrum $N_v$ in a noise period of the input pattern mean spectrum $S_w$ in a speech period of the reference pattern and mean spectrum $N_w$ in a noise period of the reference pattern. Using these spectra, the spectra S of all the reference patterns are adapted as follows:

$$\hat{S}_k = \frac{1}{2} \left( S_k + \frac{S_{w,k} - N_{w,k}}{s_{v,k} - N_{v,k}} (S_k - N_{v,k}) + N_{v,k} \right)$$

where $S_k$ is the k-th frequency component of the spectra S.

Alternatively, the time axis correspondence between the top candidate reference pattern and the input pattern is executed to obtain mean feature vector $S_v$ of the input pattern and mean feature vector $S_w$ of the reference pattern. Using these, the feature spectra S of the input pattern are adapted as follows:

$$\hat{S} = S + (S_w - S_v)/2$$

A reference pattern adapter 370 executes the adaptation based on the input pattern read out through a signal line 332, top N candidates as a result of the preliminary recognition supplied through a signal line 361 and reference patterns read out through a signal line 351. Thus adapted reference patterns are stored in a reference pattern memory 350.

In case of using method 3, for instance, a time axis correspondence between the top candidate reference pattern and the input pattern is executed to obtain mean spectrum $S_v$ in a speech period of the input pattern, mean spectrum $N_v$ in a noise period of the input pattern, mean spectrum $S_w$ in a speech period of the reference pattern and mean spectrum $N_w$ in a noise period of the reference pattern. Using these spectra, the spectra S of all the reference patterns are adapted as follows:

In the case of the reference patterns of speech as:

$$\hat{S}_k = \frac{1}{2} \left( S_k + \frac{S_{w,k} - N_{w,k}}{s_{v,k} - N_{v,k}} (S_k - N_{w,k}) + N_{v,k} \right)$$

and in the case of the reference patterns of noise as:

$$\hat{S}_k = (S_k + N_{v,k})/2$$

where $S_k$ is the k-th frequency component of the spectra S.

Alternatively, the time axis correspondence between the top candidate reference pattern and the input pattern is executed to obtain mean feature vector $S_v$ in a speech period of the input pattern, mean feature vector $N_v$ in a noise period of the input pattern, mean feature vector $S_w$ in a speech period of the reference pattern and mean feature vector $N_w$ in a noise period of the reference pattern. Using these feature spectra the feature spectra S of all the reference patterns are adapted as follows:

In the case of the reference patterns of speech as:

$$\hat{S} = S + (s_v - S_w)/2$$

and in the case of the reference patterns of noise as:

$$\hat{S} = S + (N_v - N_w)/2$$

While two examples of the adaptation system were given above as systems capable of utilization, they are by no means limitative, and it is possible to use various other adaptation systems as well for adapting reference patterns.

A final or second recognizer 380 obtains similarity measure through the matching by reading out the adapted input pattern through a signal line 396, top N candidates as a result of preliminary recognition supplied through a signal line 362, and the top candidate reference patterns through a signal line 352. The result recognition is output to an output terminal 390.

Figure 4:
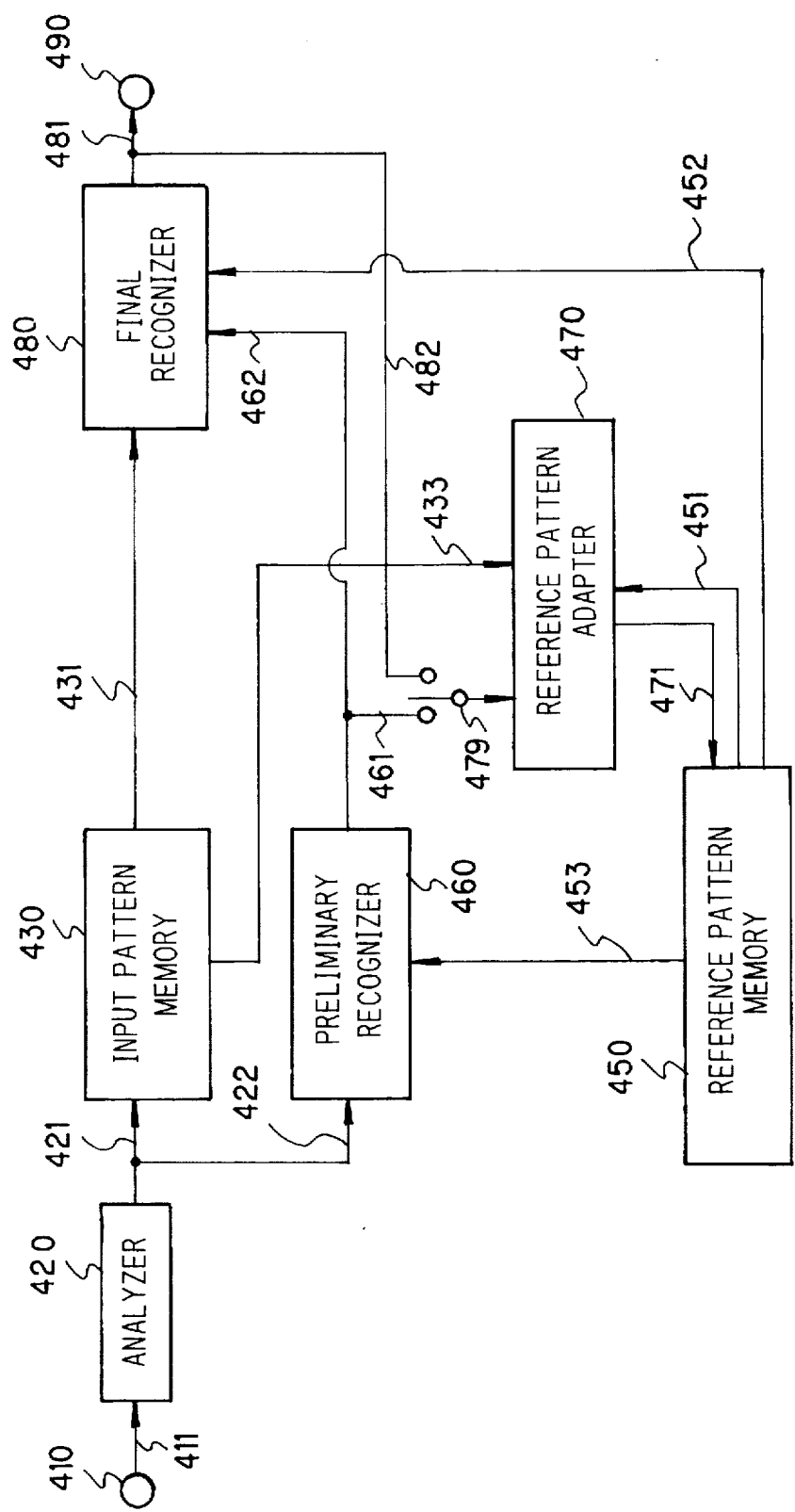
FIG. 4 shows a fourth embodiment of the speech recognizer according to the present invention.
Figure 12:
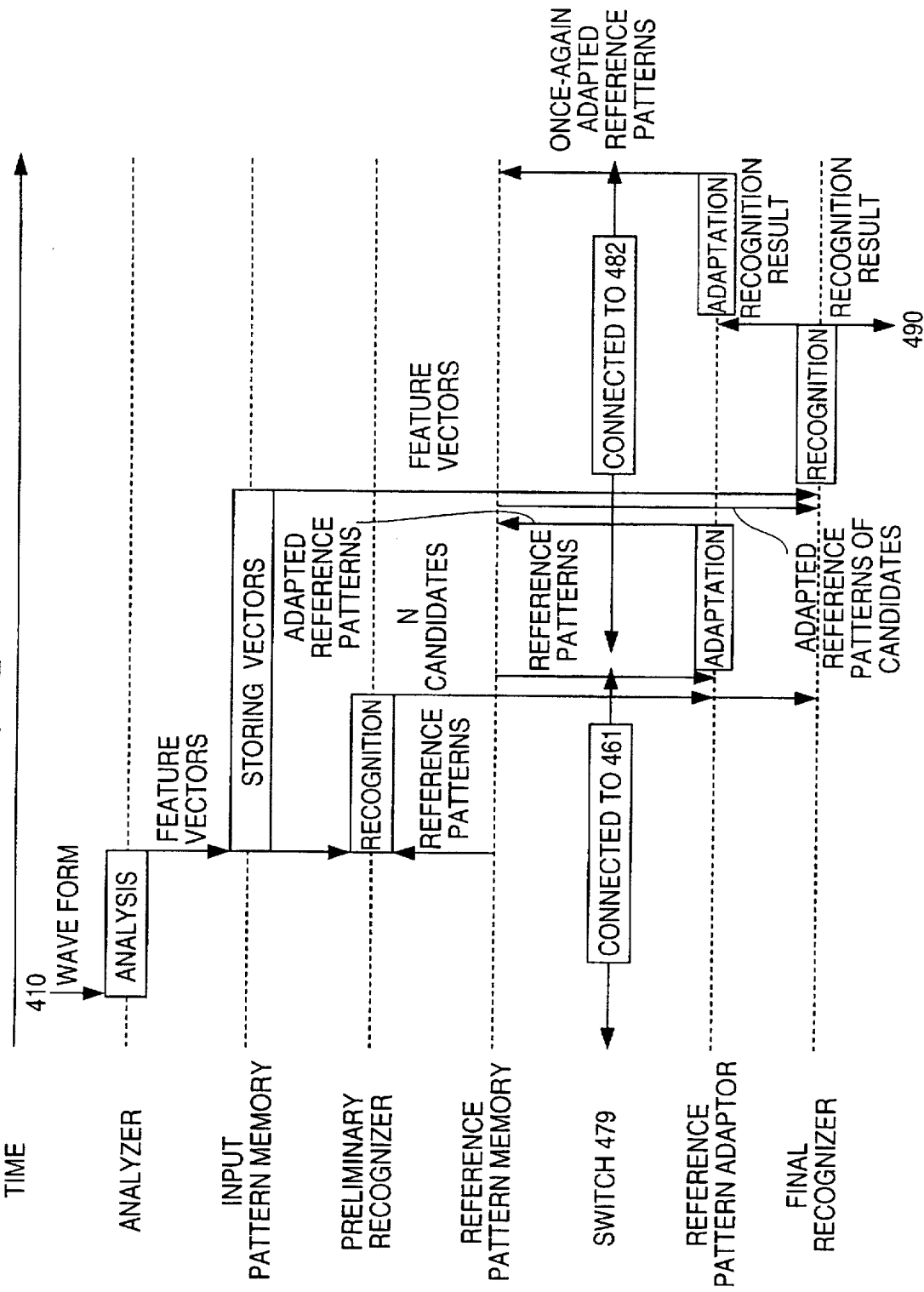

FIG. 4 shows in block diagram form a fourth embodiment of the present invention, and FIG. 12 shows a timing sequence of the fourth embodiment. Speech waveform $(X_1,$ ..., $X_N$) supplied to an input terminal 410 is converted by an analyzer 420 into feature vector series. The feature vectors thus obtained are supplied via a signal line 421 to an input pattern memory 430 and stored therein as the input pattern, and are also supplied via a signal line 422 to a preliminary recognizer 460.

The preliminary recognizer 460 executes a preliminary recognition based on the feature vectors supplied through a signal line 422 and all reference patterns read out from a reference pattern memory 450 through a signal line 453 to obtain top N candidates in the order of higher similarities.

A reference pattern adapter 470 executes the adaptation by connecting a switch 479 to a signal line 461 and reading out top N candidates as a result of preliminary recognition through the signal line 461, the input pattern through a signal line 433 and the reference patterns through a signal line 451. Thus adapted reference patterns are stored in a reference pattern memory 450.

In case of using method 3, for instance, a time axis correspondence between the top candidate reference pattern and the input pattern is executed to obtain mean spectrum $S_v$ in a speech period of the input pattern, mean spectrum $N_v$ in a noise period of the input pattern, mean spectrum $S_w$ in a speech period of the reference pattern and mean spectrum $N_w$ in a noise period of the reference pattern. Using these spectra, the spectra S of all the reference patterns are adapted as follows:

In the case of the reference patterns of speech as:

$$\hat{S}_k = \frac{S_{v,k} - N_{v,k}}{S_{w,k} - N_{w,k}} (S_k - N_{w,k}) + N_{v,k}$$

and in the case of the reference patterns of noise as:

$$\hat{S}_k = N_{v,k}$$

where $S_k$ is the k-th frequency component of the spectra S.

Alternatively, the time axis correspondence between the top candidate reference pattern and the input pattern is executed to obtain mean feature vector $S_v$ in a speech period of the input pattern, mean feature vector $N_v$ in a noise period of the input pattern, mean feature vector $S_w$ in a speech period of the reference pattern and mean feature vector $N_w$ in a noise period of the reference pattern. Using these feature spectra, the feature spectra S of all the reference patterns are adapted as follows:

In the case of the reference patterns of speech as:

$$\hat{S} = S + S_v - S_w$$

and in the case of the reference patterns of noise as:

$$\hat{S} = S + N_v - N_w$$

A final or second recognizer 480 obtains similarity measure through matching for the input pattern read out through a signal line 431, top N candidates as a result of preliminary recognition supplied through a signal line 462, and the top candidate reference patterns supplied through a signal line 452. The result recognition is output to an output terminal 490.

A reference pattern adapter 470 then executes the adaptation once again by connecting a switch 479 to a signal line 482 and reading out the recognition result in the final or second recognizor 480 through a signal line 482, the input pattern through a signal line 433 and the reference patterns through the signal line 451, the adapted reference patterns being stored in the reference pattern memory 450 to be ready for the next input.

While two examples of the adaptation system were given above as systems capable of utilization, they are by no means limitative, and it is possible to use various other adaptation systems as well for adapting reference patterns. Particularly, in this case the adaptation may be completed until the next speech input, and thus it is possible to utilize an adaptation system which deals with a great process amount. Further, in lieu of utilizing the result of the final recognition, it is possible to utilize the results of user's confirmation or correction of the result of the final recognizer.

Figure 5:
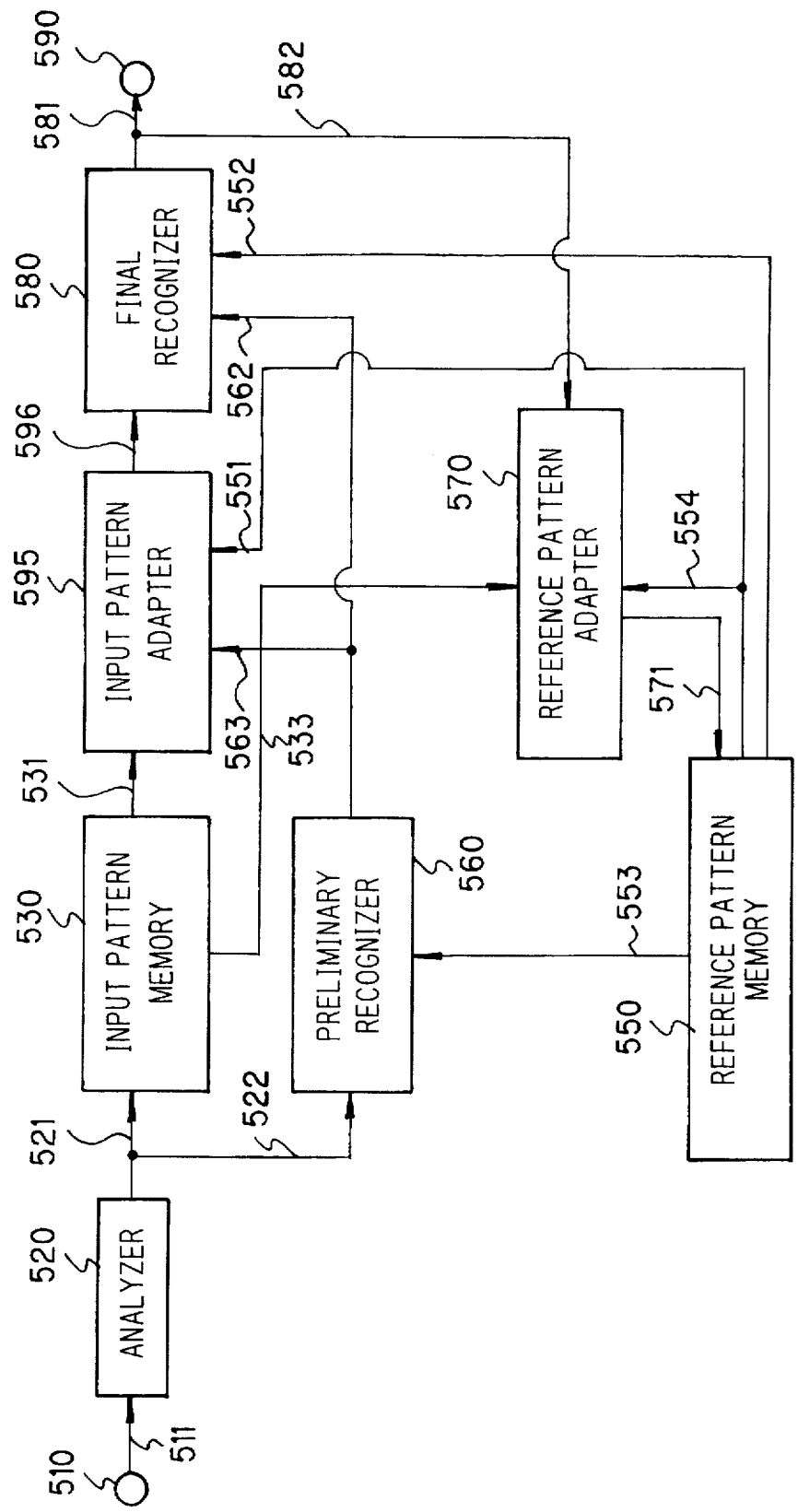
FIG. 5 shows a fifth embodiment of the speech recognizer according to the present invention.
Figure 13:
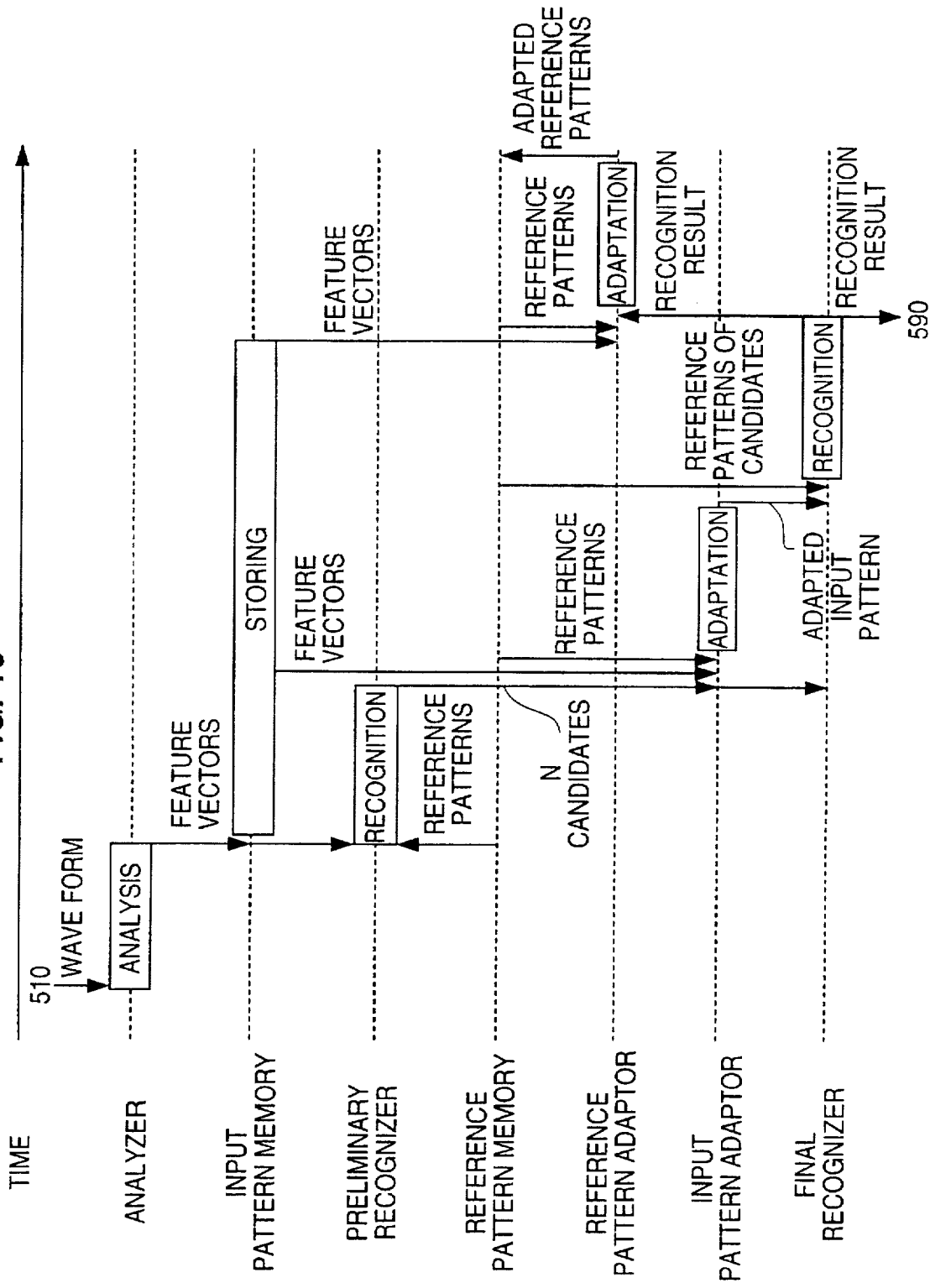

FIG. 5 shows in block diagram form a fifth embodiment of the present invention, and FIG. 13 shows a timing sequence of the fifth embodiment. Speech waveform ($X_1$, ..., $X_N$) supplied to an input terminal 510 is converted by an analyzer 520 into feature vector series. The feature vectors thus obtained are supplied via a signal line 521 to an input pattern memory 530 and stored therein as the input pattern, and are also supplied via a signal line 522 to a preliminary recognizer 560.

The preliminary recognizer 560 executes a preliminary recognition based on the feature vectors supplied through a signal line 522 and all reference patterns read out from a reference pattern memory 550 through a signal line 553 to obtain top N candidates in the order of higher similarities.

An input pattern adapter 595 executes the adaptation of input pattern based on the input pattern through a signal line 531, top N candidates as a result of preliminary recognition through a signal line 563 and the reference patterns through a signal line 551. Thus adapted input pattern is output to a signal line 596.

In case of using method 3 as the adaptation method of the input pattern, for instance, a time axis correspondence between the top candidate reference pattern and the input pattern is executed to obtain mean spectrum $S_v$ in a speech period of the input pattern, mean spectrum $N_v$ in a noise period of the input pattern, mean spectrum $S_w$ in a speech period of the reference pattern and mean spectrum $N_w$ in a noise period of the reference pattern. Using these spectra, the spectra S of the input pattern are adapted as follows:

$$\hat{S}_k = \frac{S_{w,k} - N_{w,k}}{S_{v,k} - N_{v,k}} (S_k - N_{v,k}) + N_{w,k}$$

where $S_k$ is the k-th frequency component of the spectra S.

Alternatively, the time axis correspondence between the top candidate reference pattern and the input pattern is executed to obtain mean feature vector $S_v$ of the input pattern and mean feature vector $S_w$ of the reference pattern. Using these feature spectra, the feature spectra S of the input pattern are adapted as follows:

$$\hat{S} = S + S_w - S_v$$

While two examples of the adaptation system were given above as systems capable of utilization, they are by no means limitative, and it is possible to use various other adaptation systems as well for adapting reference patterns.

A final recognizer 580 receives the input pattern through a signal line 596, top N candidates as a result of preliminary recognition through a signal line 562, and the top candidate reference patterns through a signal line 552, and executes the matching for the recognition. The recognition result is output to an output terminal 590.

A reference pattern adapter 570 then executes the adaptation based on the recognition result in the final 580 through a signal line 582, the input pattern through a signal line 533 and the reference patterns through a signal line 554. Thus adapted reference patterns are stored in a reference pattern memory 550 to be ready for the next input.

In case of using method 3, for instance, a time axis correspondence between the top candidates reference pattern and the input pattern is executed to obtain mean spectrum $S_v$ in a speech period of the input pattern, mean spectrum $N_v$ in a noise period of the input pattern, mean spectrum $S_w$ in a speech period of the reference pattern and mean spectrum $N_w$ in a noise period of the reference pattern. Using these spectra, the spectra S of the all reference patterns are adapted as follows:

In the case of the reference patterns of speech as:

$$\hat{S}_k = \frac{S_{v,k} - N_{v,k}}{S_{w,k} - N_{w,k}} (S_k - N_{w,k}) + N_{v,k}$$

In the case of the reference patterns of noise as:

$$\hat{S}_k = N_{v,k}$$

where $S_k$ is the k-th frequency component of the spectra S.

Alternatively, the time axis correspondence between the top candidate reference pattern and the input pattern is executed to obtain mean feature vector $S_v$ of the input pattern and mean feature vector $S_w$ of the reference pattern. Using these feature spectra, the feature spectra S of the all reference patterns are adapted as follows:

In the case of the reference patterns of speech as:

$$\hat{S} = S + S_v - S_w$$

In the case of the reference patterns of noise as:

$$\hat{S} = S + N_v - N_w$$

While two examples of the adaptation system were given above as systems capable of utilization, they are by no means limitative, and it is possible to use various other adaptation systems as well for adapting reference patterns. Particularly in this case the adaptation may be completed until the next speech input, and thus it is possible to utilize an adaptation system which deals with a great process amount. Further, in lieu of utilizing the result of the final or second recognition, it is possible to utilize the results of user's confirmation or correction of the result of the final or second recognizor.

Figure 6:
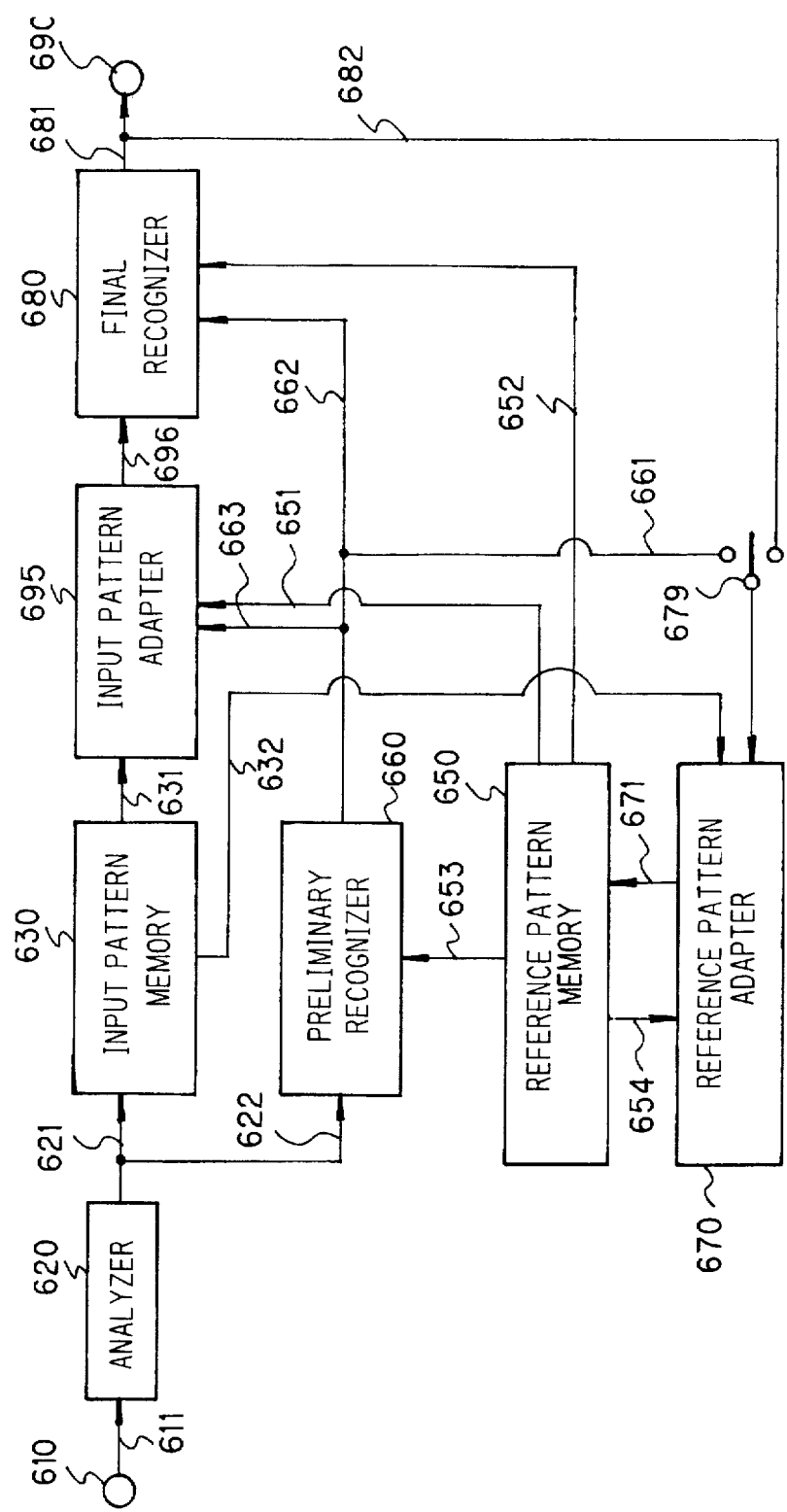
FIG. 6 shows a sixth embodiment of the speech recognizer according to the present invention.
Figure 14:
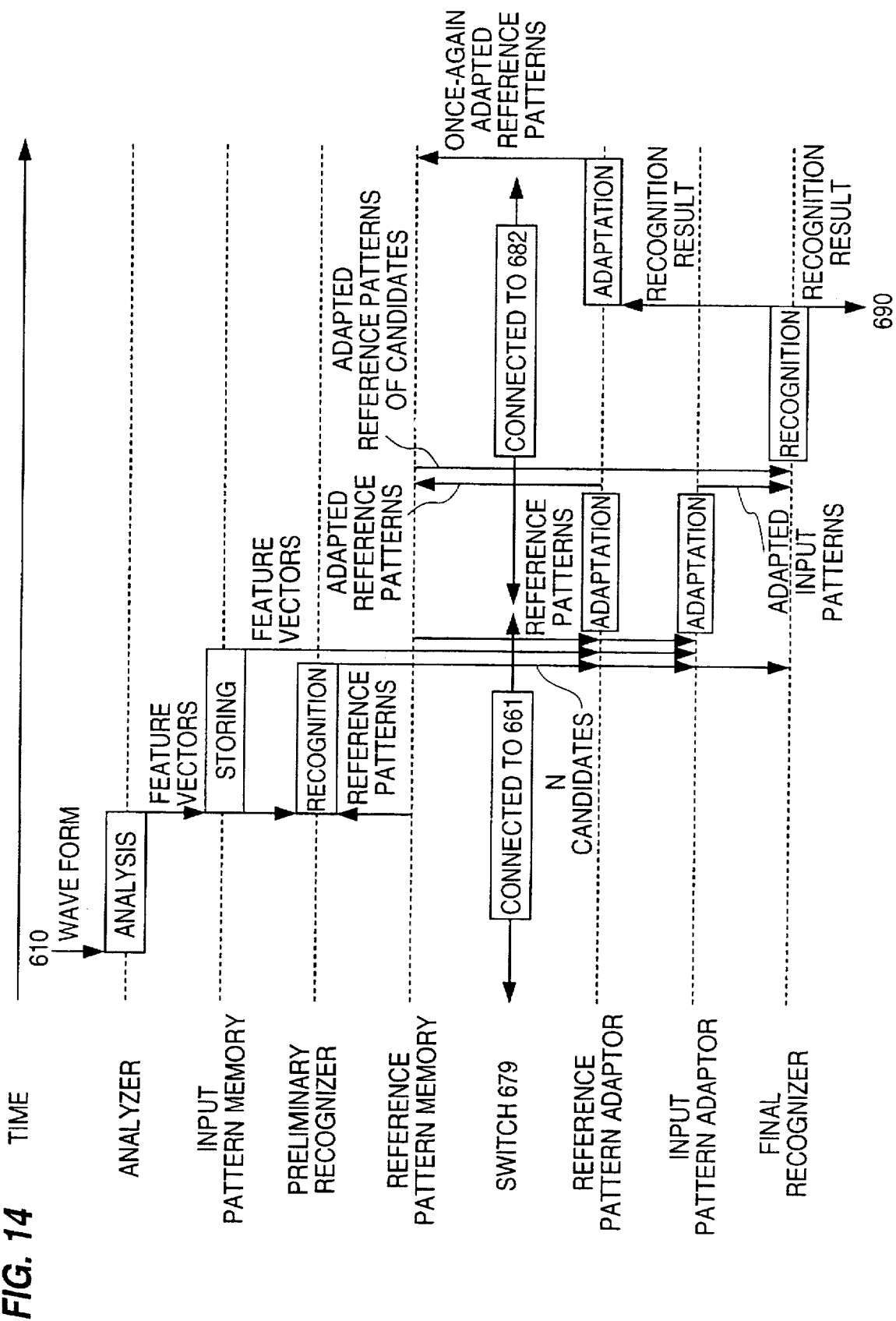

FIG. 6 shows in block diagram form a sixth embodiment of the present invention, and FIG. 14 shows a timing sequence of the sixth embodiment. Speech waveform ($X_1$, ..., $X_N$) supplied to an input terminal 610 is converted by an analyzer 620 into feature vector series. Thus obtained feature vectors are supplied via a signal line 621 to an input pattern memory 630 and stored therein as the input pattern, and are also supplied via a signal line 622 to a preliminary recognizer 660.

The preliminary recognizer 660 executes a preliminary recognition based on the feature vectors supplied through a signal line 622 and all reference patterns read out from a reference pattern memory 650 to obtain top N candidates in the order of higher similarities.

An input pattern adapter 695 executes the adaptation of input pattern based on the input pattern through a signal line 631, top N candidates as a result of preliminary recognition through a signal line 663 and the reference patterns through a signal line 651. Thus adapted input pattern is output to a signal line 696.

In case of using method 3 as the adaptation method for the input pattern, for instance, a time axis correspondence between the top candidate reference pattern and the input pattern is executed to obtain mean spectrum $S_v$ in a speech period of the input pattern, mean spectrum $N_v$ in a noise period of the input pattern, mean spectrum $S_w$ in a speech period of the reference pattern and mean spectrum $N_w$ in a noise period of the reference pattern. Using these spectra, the spectra S of all the reference patterns are adapted as follows:

$$\hat{S}_k = \frac{1}{2} \left( S_k + \frac{S_{w,k} - N_{w,k}}{S_{v,k} - N_{v,k}} (s_k - N_{v,k}) + N_{w,k} \right)$$

where $S_k$ is the k-th frequency component of the spectra S.

Alternatively, the time axis correspondence between the top candidate reference pattern and the input pattern is executed to obtain mean feature vector $S_v$ of the input pattern and mean feature vector $S_w$ of the reference pattern. Using these feature spectra, the feature spectra S of the input pattern are adapted as follows:

$$\hat{S} = S + (S_w - S_v)/2$$

A reference pattern adapter 670 executes the adaptation by connecting a switch 679 to a signal line 661 and reading out the input pattern through a signal line 632, top N candidates as a result of preliminary recognition supplied through the signal line 661 and the reference patterns through a signal line 654. The adapted reference patterns are stored in the reference pattern memory 650.

In case of using method 3 for the adaptation, for instance, a time axis correspondence between the top candidate reference pattern and the input pattern is executed to obtain mean spectrum $S_v$ in a speech period of the input pattern, mean spectrum $N_n$ in a noise period of the input pattern, mean spectrum $S_w$ in a speech period of the reference pattern and mean spectrum $N_w$ in a noise period of the reference pattern. Using these spectra, the spectra S of all the reference patterns are adapted as follows:

In the case of the reference patterns of speech as:

$$\hat{S}_k = \frac{1}{2} \left( S_k + \frac{S_{v,k} - N_{v,k}}{S_{w,k} - N_{w,k}} (s_k - N_{w,k}) + N_{v,k} \right)$$

and in the case of the reference patterns of noise as:

$$\hat{S}_k = (S_k + N_{v,k})/2$$

Alternatively, the time axis correspondence between the top candidate reference pattern and the input pattern is executed to obtain mean feature vector $S_v$ in a speech period of the input pattern, mean feature vector $N_v$ in a noise period of the input pattern, mean feature vector $S_w$ in a speech period of the reference pattern and mean feature vector $N_w$ in a noise period of the reference pattern. Using these feature spectra, the feature spectra S of all the reference patterns are adapted as follows:

In the case of the reference patterns of speech as:

$$\hat{S} = S + (S_v - S_w)/2$$

and in the case of the reference patterns of noise as:

$$\hat{S} = S + (N_v - N_w)/2$$

While two examples of the adaptation system were given above as systems capable of utilization, they are by no means limitative, and it is possible to use various other adaptation systems as well for adapting reference patterns.

A final or second recognizer 680 receives the adapted input pattern through a signal line 696, top N candidates as a result of preliminary recognition through a signal line 662, and the top N candidate reference patterns through a signal line 652 and executes the matching for the recognition. The recognition result is output to an output terminal 690.

A reference pattern adapter 670 then executes the adaptation by connecting a switch 679 to a signal line 682 and reading out the result of recognition in the final or second recognizor 680 through the signal line 682, the input pattern through a signal line 632 and the reference patterns through a signal line 654. The adapted reference patterns are stored in the reference pattern memory 650 to be ready for the next input.

In case of using method 3 as the adaptation method, for instance, a time axis correspondence between the top result candidate reference pattern and the input pattern is executed to obtain mean spectrum $S_v$ in a speech period of the input pattern, mean spectrum $N_v$ in a noise period of the input pattern, mean spectrum $S_w$ in a speech period of the reference pattern and mean spectrum $N_w$ in a noise period of the reference pattern. Using these spectra, the spectra S of all the reference patterns are adapted as follows:

In the case of the reference patterns of speech as:

$$\hat{S}_k = \frac{S_{v,k} - N_{v,k}}{S_{w,k} - N_{w,k}} (S_k - N_{w,k}) + N_{v,k}$$

and in the case of the reference patterns of noise as:

$$\hat{S}_k = N_{v,k}$$

where $S_k$ is the k-th frequency component of the spectra S.

Alternatively, the time axis correspondence between the top candidate reference pattern and the input pattern is executed to obtain mean feature vector $S_v$ in a speech period of the input pattern, mean feature vector $N_v$ in a noise period of the input pattern, mean feature vector $S_w$ in a speech period of the reference pattern and mean feature vector NW in a noise period of the reference pattern. Using these feature spectra, the feature spectra S of all the reference patterns are adapted as follows:

In the case of the reference patterns of speech as:

$$\hat{S} = S + S_v - S_w$$

and in the case of the reference patterns of noise as:

$$\hat{S} = S + N_v - N_w$$

While two examples of the adaptation system were given above as systems capable of utilization, they are by no means limitative, and it is possible to use various other adaptation systems as well for adapting reference patterns. Particularly in this case the adaptation may be completed until the next speech input, and thus it is possible to utilize an adaptation system which deals with a great process amount. Further, in lieu of utilizing the result of the final or second recognition, it is possible to utilize the results of user's confirmation or correction of the result of the final recognizor.

Figure 7:
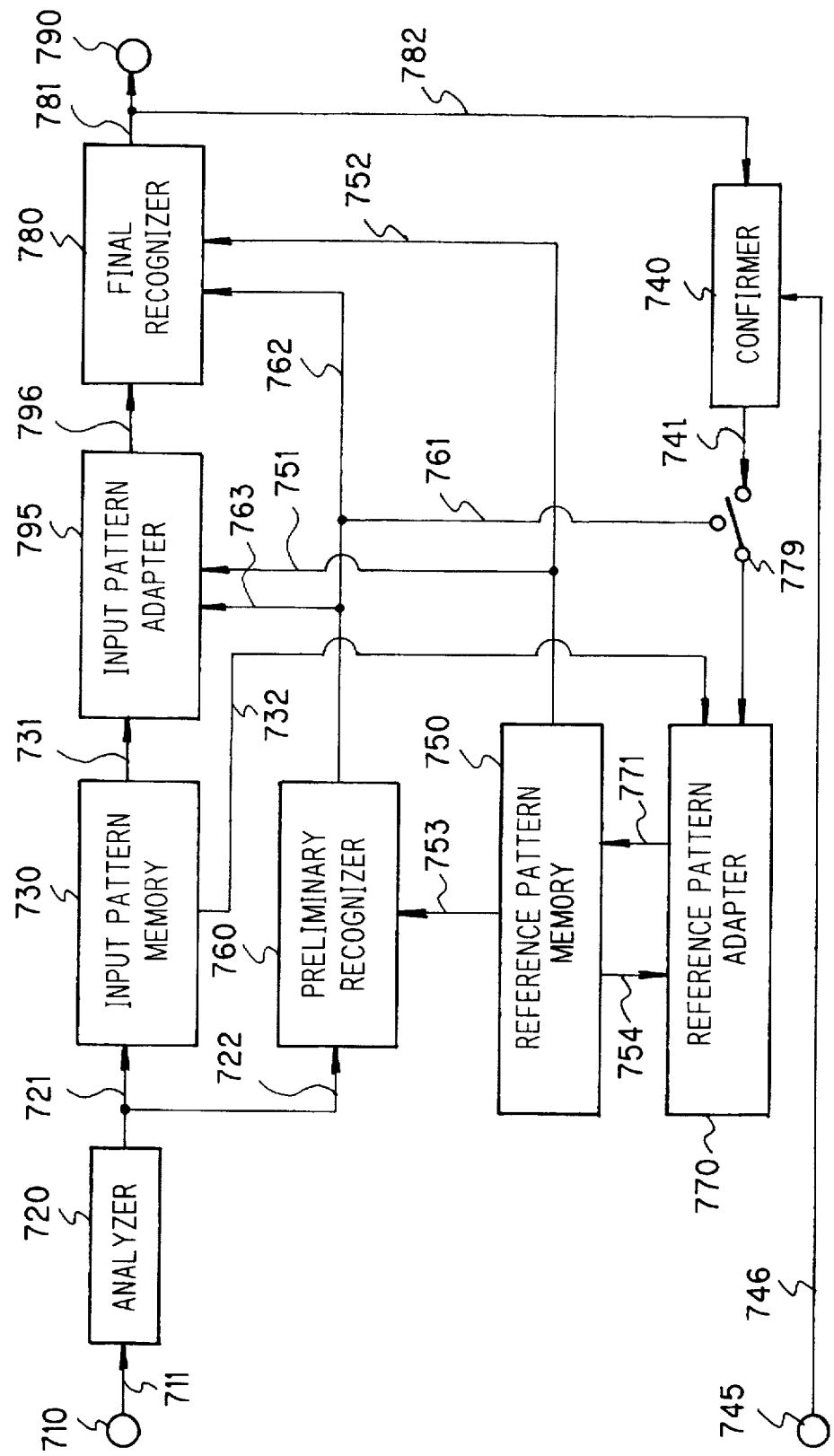
FIG. 7 shows a seventh embodiment of the speech recognizer according to the present invention.
Figure 8:
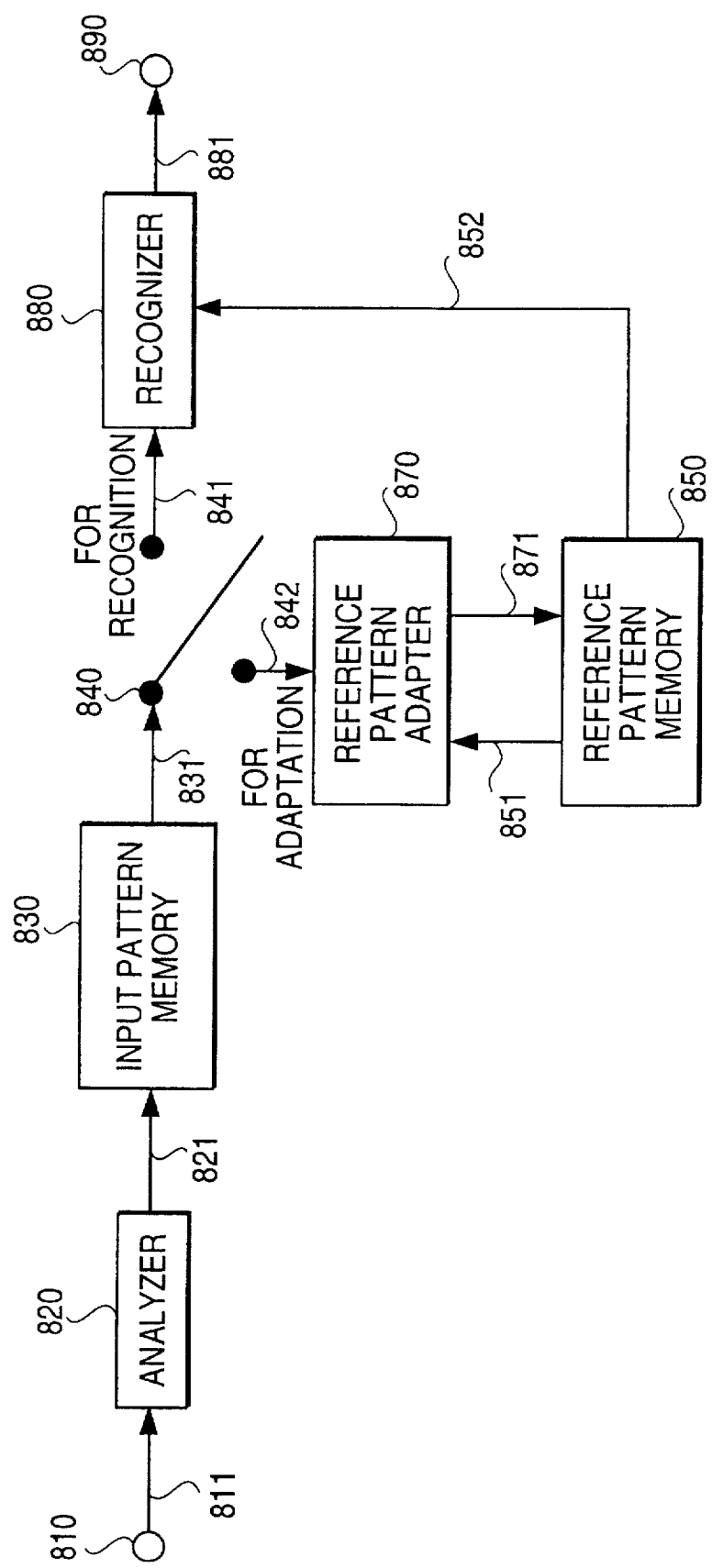
FIG. 8 shows conventional speech recognizer.
Figure 15:
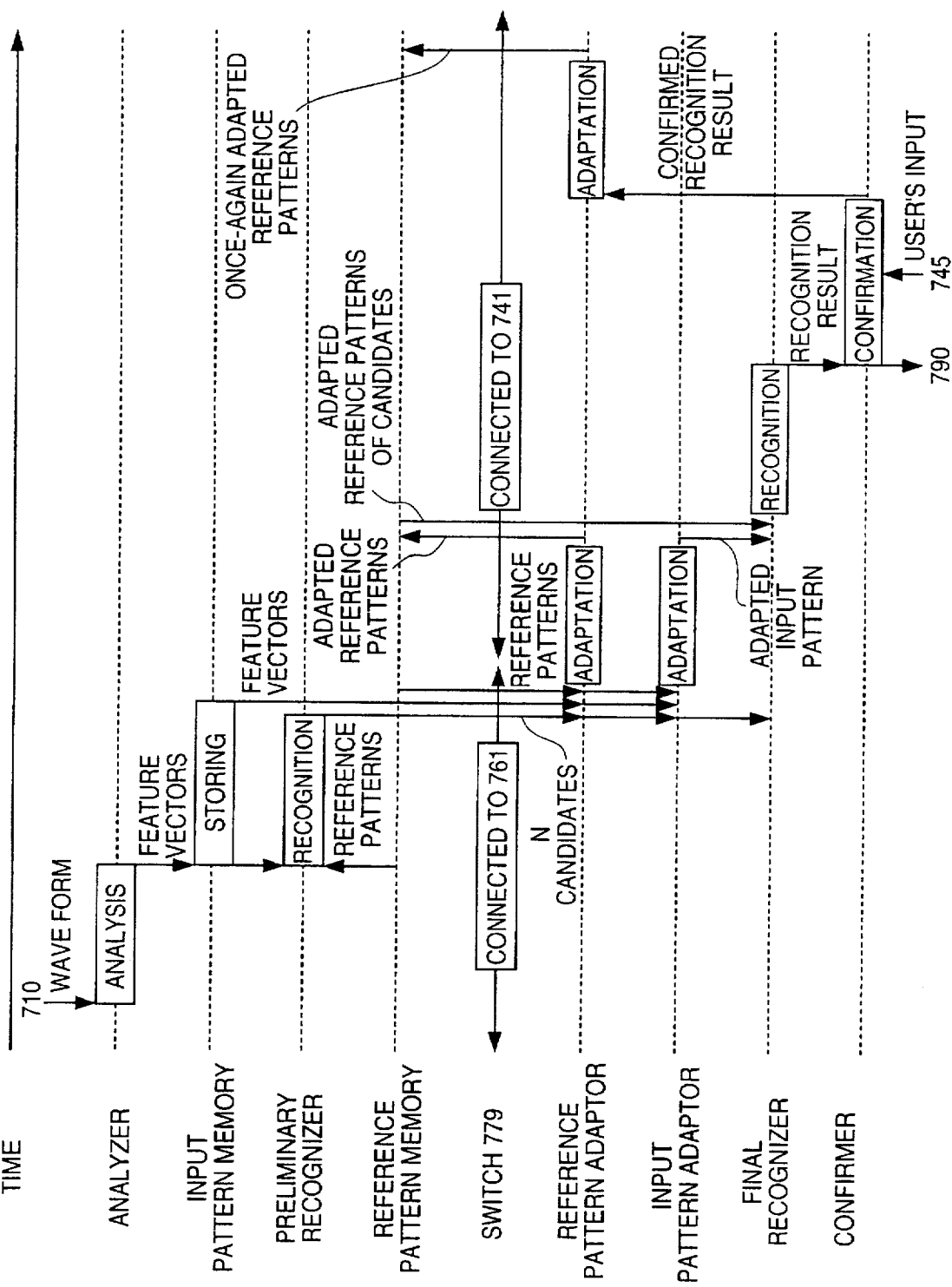

FIG. 7 shows in block diagram form a seventh embodiment of the present invention, and FIG. 15 shows a timing sequence of the seventh embodiment. Speech waveform $(X_1, \ldots, X_N)$ supplied to an input terminal 710 is converted by an analyzer 720 into feature vector series. The feature vectors thus obtained are supplied via a signal line 721 to an input pattern memory 730 and stored therein as the input pattern, and are also supplied via a signal line 722 to a preliminary recognizer 760.

The preliminary recognizer 760 executes a preliminary recognition based on the feature vectors supplied through a signal line 722 and all reference patterns read out from a reference pattern memory 750 to obtain top N candidates in the order of higher similarities.

An input pattern adapter 795 executes the adaptation of input pattern based on the input pattern through a signal line 731, the top N candidates as a result of preliminary recognition through a signal line 763 and the reference patterns through a signal line 751. Thus adapted input pattern is output to a signal line 786.

In case of using method 3, for instance, a time axis correspondence between the top candidate reference pattern and the input pattern is executed to obtain mean spectrum $S_v$ in a speech period of the input pattern, mean spectrum $N_v$ in a noise period of the input pattern, mean spectrum $S_w$ in a speech period of the reference pattern and mean spectrum $N_w$ in a noise period of the reference pattern. Using these spectra, the spectra S of the input pattern are adapted as follows:

$$\hat{S}_k = \frac{1}{2} \left( S_k + \frac{S_{w,k} - N_{w,k}}{S_{v,k} - N_{v,k}} (s_k - N_{v,k}) + N_{w,k} \right)$$

where $S_k$ is the k-th frequency component of the spectra S.

Alternatively, the time axis correspondence between the top candidate reference pattern and the input pattern is executed to obtain mean feature vector $S_v$ of the input pattern and mean feature vector $S_w$ of the reference pattern. Using these feature spectra, the feature spectra S of the input pattern are adapted as follows:

$$\hat{S} = S + (S_w - S_v)/2$$

A reference pattern adapter 770 connects a switch 779 to a signal line 761 to read out the input pattern through a signal line 732, top N candidates as a result of preliminary recognition through a signal line 761 and reference patterns through a signal line 754 and executes the adaptation based on them. Thus adapted reference patterns are stored in a reference pattern memory 750.

In case of using method 3 as the adaptation method, for instance, a time axis correspondence between the top candidate reference pattern and the input pattern is executed to obtain mean spectrum $S_v$ in a speech period of the input pattern, mean spectrum $N_v$ in a noise period of the input pattern, mean spectrum $S_w$ in a speech period of the reference pattern and mean spectrum $N_w$ in a noise period of the reference pattern. Using these spectra, the spectra S of the input pattern are adapted as follows:

In the case of the reference patterns of speech as:

$$\hat{S}_k = \frac{1}{2}\left(S_k + \frac{S_{v,k} - N_{v,k}}{S_{w,k} - N_{w,k}}(s_k - N_{w,k}) + N_{v,k}\right)$$

and in the case of the reference patterns of noise as:

$$\hat{S}_k = (S_k + N_{v,k})/2$$

where $S_k$ is the k-th frequency component of the spectra S.

Alternatively, the time axis correspondence between the top candidate reference pattern and the input pattern is executed to obtain mean feature vector $S_v$ in a speech period of the input pattern, mean feature vector $N_v$ in a noise period of the input pattern, mean feature vector $S_w$ in a speech period of the reference pattern and mean feature vector $N_w$ in a noise period of the reference pattern. Using these feature spectra, the feature spectra S of all the reference patterns are adapted as follows:

In the case of the reference patterns of speech as:

$$\hat{S} = S + (S_v - S_w)/2$$

and in the case of the reference patterns of noise as:

$$\hat{S} = S + (N_v - N_w)/2$$

While two examples of the adaptation system were given above as systems capable of utilization, they are by no means limitative, and it is possible to use various other adaptation systems as well for adapting reference patterns.

A final or second recognizer 780 receives the adapted input pattern through a signal line 786, top N candidates as a result of preliminary recognition through a signal line 762, and the candidate reference patterns through a signal line 752 and executes the matching for the recognition. The recognition result is output to an output terminal 790.

A confirmer 740 receives the final recognition result through a signal line 782 and a user's confirmation result for the recognition result in the final or second recognizer 780 through a terminal 745 corrects the final recognition result if the final recognition result is wrong and outputs the correct recognition result to a signal line 741.

A reference pattern adapter 770 then executes the adaptation by connecting a switch 779 to a signal line 741 and reading out the right recognition result through the signal line 741, the input pattern through a signal line 732 and the reference patterns through a signal line reference pattern memory 750 to be ready for the next input.

In case of using method 3 as the adapter method, for instance, a time axis correspondence between the top candidate reference pattern and the input pattern is executed to obtain mean spectrum $S_v$ in a speech period of the input pattern, mean spectrum $N_v$ in a noise period of the input pattern, mean spectrum $S_w$ in a speech period of the reference pattern and mean spectrum $N_w$ in a noise period of the reference pattern. Using these spectra, the spectra S of all the reference patterns are adapted as follows:

In the case of the reference patterns of speech as:

$$\hat{S}_k = \frac{S_{v,k} - N_{v,k}}{S_{w,k} - N_{w,k}}(S_k - N_{v,k}) + N_{w,k}$$

and in the case of the reference patterns of noise as:

$$\hat{S}_k = N_{v,k}$$

where $S_k$ is the k-th frequency component of the spectra S.

Alternatively, the time axis correspondence between the top candidate reference pattern and the input pattern is executed to obtain mean feature vector $S_v$ in a speech period of the input pattern, mean feature vector $N_v$ in a noise period of the input pattern, mean feature vector $S_w$ in a speech period of the reference pattern and mean feature vector $N_w$ in a noise period of the reference pattern. Using these feature spectra, the feature spectra S of all the reference patterns are adapted as follows:

In the case of the reference patterns of speech as:

$$\hat{S} = S + S_v - S_w$$

and in the case of the reference patterns of noise as:

$$\hat{S} = S + N_v - N_w$$

While two examples of the adaptation system were given above as systems capable of utilization, they are by no means limitative, and it is possible to use various other adaptation systems as well for adapting reference patterns. Particularly in this case the adaptation may be completed until the next speech input, and thus it is possible to utilize an adaptation system which deals with a great process amount.

In this case, since the adaptation is always executed by using correct recognition result, it is possible to obtain adaptation with a higher accuracy and improve the recognition accuracy.

As has been described above, in the present invention the adaptation is executed using the input speech up to a certain instant of time, the preliminary recognition of the speech to be recognized of the next time instant is executed for the preliminary selection of words, and the adaptation is executed by using the speech to be recognized. It is thus possible to obtain final recognition with respect to the preliminarily selected words, thus permitting high recognition rate without degrading the response feature of the system even in case of an environment different from that of reference pattern trained.

Changes in construction will occur to those skilled in the art and various apparently different modifications and embodiments may be made without departing from the scope of the invention. The matter set forth in the foregoing description and accompanying drawings is offered by way of illustration only. It is therefore intended that the foregoing description be regarded as illustrative rather than limiting.

What is claimed is:

1. A speech recognition system comprising:

a speech waveform analyzer for converting an input speech waveform into feature vectors;

an input pattern memory for storing the feature vectors as an input pattern;

a reference pattern memory for storing reference patterns of recognition subject words;

a preliminary recognizer for obtaining a similarity measure between the input pattern and each of the reference patterns, determining at least one reference pattern as at least one candidate recognition result based on the similarity measures, and outputting top N candidates, N being an integer greater than zero, using the obtained similarity measures;

a reference pattern adapter for:

(a) executing adaptation of the reference patterns based on (i) the reference patterns, (ii) the input pattern, and (iii) the top N candidates, and (b) newly storing the adapted reference patterns as reference patterns in the reference pattern memory; and a final recognizor for executing speech recognition to obtain one top candidate by using the adapted reference patterns and the input pattern.

2. The speech recognition system according to claim 1, further comprising a switch for inputting the top N candidates obtained in the preliminary recognizor and the result of recognition in the final or second recognizer to the reference pattern adapter, the adaptation of the reference patterns being executed by using the input pattern in the input pattern memory and the top N candidates or the result of recognition.

3. The speech recognition system according to claim 2, which further comprises an input unit for inputting a result of user's confirmation and/or correction of the result of recognition in the final or second recognizer, the reference pattern adapter executing adaptation of the reference patterns by using the top N candidates obtained in the preliminary recognizer or the result of recognition in the final or second recognizor, the input pattern in the input pattern memory, and the reference patterns in the reference pattern memory.

4. The speech recognition system according to claim 1, wherein the adaptation of the reference patterns is once again executed by using the input pattern in the input pattern memory, the reference patterns in the reference pattern memory, and the result of recognition in the final or second recognizer.

5. The speech recognition system according to claim 4, which further comprises an input unit for inputting the result of user's confirmation and/or correction of the result of recognition in the final or second recognizer, the reference pattern adapter executing adaptation once again of the reference patterns by using the top N candidates obtained in the preliminary recognizer or the result of recognition in the final or second recognizor, the input pattern in the input pattern memory, and the reference patterns in the reference pattern memory.

6. A speech recognition system comprising:

a speech waveform analyzer for converting an input speech waveform into feature vectors;

an input pattern memory for storing the feature vectors as an input pattern;

a reference pattern memory for storing reference patterns of recognition subject words;

a preliminary recognizer for obtaining a similarity measure between the input pattern and each of the reference patterns and outputting top N candidates, N being an integer greater than zero, using the obtained similarity measures;

an input pattern adapter for executing adaptation of the input pattern based on (i) the reference patterns, (ii) the input pattern, and (iii) the top N candidates; and a final or second recognizer for executing speech recognition to obtain one top candidate based on (i) the reference patterns and (ii) the adapted input pattern.

7. A speech recognition system comprising:

a speech waveform analyzer for converting an input speech waveform into feature vectors;

an input pattern memory for storing the feature vectors as an input pattern;

a reference pattern memory for storing reference patterns of recognition subject words;

a preliminary recognizer for obtaining a similarity measure between the input pattern and each of the reference patterns and outputting top N candidates, N being an integer greater than zero, using the obtained similarity measures;

a reference pattern adapter for:

(a) executing adaptation of the reference patterns based on (i) the reference patterns, (ii) the input pattern, and (iii) the top N candidates, and (b) newly storing the adapted reference patterns as reference patterns in the reference pattern memory;

an input pattern adapter for executing adaptation of the input pattern based on (i) the reference patterns, (ii) the input pattern, and (iii) the top N candidates; and a final recognizor for executing speech recognition to obtain one top candidate based on (i) the reference patterns and (ii) the adapted input pattern.

8. The speech recognition system according to claim 7, wherein the adaptation of the reference patterns is once again executed based on the input pattern in the input pattern memory, the reference patterns in the reference pattern memory, and the recognition result in the final or second recognizer.

9. The speech recognition system according to claim 8, which further comprises an input unit for inputting the result of user's confirmation and/or correction of the result of recognition in the final or second recognizer, the reference pattern adapter executing adaptation of the reference patterns by using the top N candidates obtained in the preliminary recognizer or the result of recognition in the final or second recognizor, the input pattern in the input pattern memory, and the reference patterns in the reference pattern memory.

10. The speech recognition system comprising:

an analyzer for converting a speech signal input into feature vector series;

an input pattern memory for storing the feature vector series as an input pattern;

a reference pattern memory for storing reference patterns;

a preliminary recognizor for executing preliminary recognition by using (i) the input pattern and (ii) all reference patterns stored in the reference pattern memory to obtain a plurality of candidates in an order of higher similarities;

a reference pattern adapter for:

(a) executing adaptation of the reference patterns by using (i) the input pattern, (ii) a plurality of candidates as a result of the preliminary recognition, and (iii) the reference patterns corresponding to the plurality of candidates, and (b) storing the adapted reference patterns in the reference pattern memory; and a final recognizor for executing re-recognition of the input pattern by using the adapted reference patterns corresponding to the plurality of candidates obtained as a result of the preliminary recognition.

11. The speech recognition system comprising:

an analyzer for converting a speech signal input into feature vector series;

an input pattern memory for storing the feature vector series as an input pattern;

a reference pattern memory for storing reference patterns;

a preliminary recognizer for executing a preliminary recognition based on (i) the input pattern and (ii) all reference patterns read out from the reference pattern memory to obtain top N candidates in an order of higher similarities;

a reference pattern adapter for:
(a) executing adaptation of the reference patterns based on (i) the input pattern, (ii) top N candidate reference patterns as a result of the preliminary recognition, and (iii) the reference patterns, and
(b) storing the reference patterns in a reference pattern memory; and a final recognizer for obtaining similarity measure through (i) a matching process for the input pattern, (ii) the top N candidates as a result of preliminary recognition, and (iii) the reference patterns corresponding to the top N candidates.

12. A speech recognition system comprising:

an analyzer for converting a speech signal input into feature vector series;

an input pattern memory for storing the feature vector series as an input pattern;

a reference pattern memory for storing reference patterns;

a preliminary recognizer for executing preliminary recognition based on (i) the input pattern and (ii) all reference patterns read out from the reference pattern memory to obtain top N candidates in an order of higher similarities;

an input pattern adapter for executing adaptation of the input pattern based on (i) the input pattern, (ii) the top N candidates as a result of preliminary recognition, and (iii) the reference patterns; and a final recognizer for:
(a) reading out (i) the adapted input pattern, (ii) the top N candidates as a result of preliminary recognition, and (iii) the reference patterns corresponding to the top N candidates, and
(b) executing the recognition by a matching process.

13. A speech recognition system comprising:

an analyzer for converting a speech signal input into feature vector series;

an input pattern memory for storing the feature vector series as an input pattern;

a reference pattern memory for storing reference patterns;

a preliminary recognizer for executing a preliminary recognition based on (i) the input pattern and (ii) all reference patterns read out from the reference pattern memory to obtain top N candidates in an order of higher similarities;

an input pattern adapter for executing adaptation of the input pattern based on (i) the input pattern, (ii) the top N candidates as a result of preliminary recognition, and (iii) the reference patterns;

a reference pattern adapter for:
(a) executing adaptation of the reference patterns based on (i) the input pattern, (ii) the top N candidates as a result of the preliminary recognition, and (iii) the reference patterns, and
(b) storing the adapted reference patterns in the reference pattern memory; and a final recognizer for obtaining similarity measure through a matching process by reading out (i) the adapted input pattern, (ii) the top N candidate reference patterns as a result of preliminary recognition, and (iii) the reference patterns corresponding to the top N candidates.

14. A speech recognition system comprising:

an analyzer for converting a speech signal input into feature vector series;

an input pattern memory for storing the feature vector series as an input pattern;

a reference pattern memory for storing reference patterns;

a preliminary recognizer for executing a preliminary recognition based on (i) the input pattern and (ii) all reference patterns read out from the reference pattern memory to obtain top N candidates in an order of higher similarities;

a reference pattern adapter for executing adaptation of the reference patterns by:
(a) reading out (i) the top N candidates as a result of preliminary recognition, (ii) the input pattern, and (iii) the reference patterns, and
(b) storing the adapted reference patterns in the reference pattern memory;

a final recognizer for obtaining similarity measure through matching for (i) the input pattern, (ii) the top N candidates as a result of preliminary recognition, and (iii) the reference patterns corresponding to the top N candidates; and a reference pattern adapter for:
(a) executing the adaptation of the reference patterns once again by reading out (i) the recognition result in the final or second recognizor, (ii) the input pattern, and (iii) the reference patterns, and
(b) storing the adapted reference patterns in the reference pattern memory to be ready for the next input.

15. A speech recognition system comprising:

an analyzer for converting a speech signal input into feature vector series;

an input pattern memory for storing the feature vector series as an input pattern;

a reference pattern memory for storing reference patterns;

a preliminary recognizer for executing a preliminary recognition based on (i) the input pattern and (ii) all reference patterns read out from the reference pattern memory to obtain top N candidates in an order of higher similarities;

an input pattern adapter for executing adaptation of the input pattern based on (i) the input pattern, (ii) the top N candidates as a result of preliminary recognition, and (iii) the reference patterns;

a final recognizer for:
(a) receiving (i) the input pattern, (ii) the top N candidates as a result of preliminary recognition, and (iii) the reference patterns corresponding to the top N candidates, and
(b) executing a matching process for the recognition; and a reference pattern adapter for:
(a) executing the adaptation of the reference patterns based on (i) the recognition result in the final or second recognizor, (ii) the input pattern, and (iii) the reference patterns, and
(b) storing the adapted reference patterns in the reference pattern memory to be ready for the next input.

16. A speech recognition system comprising:

an analyzer for converting a speech signal input into feature vector series;

an input pattern memory for storing the feature vector series as an input pattern;

a reference pattern memory for storing reference patterns;

a preliminary recognizer for executing a preliminary recognition based on (i) the input pattern and (ii) all reference patterns read out from the reference pattern memory to obtain top N candidates in an order of higher similarities;

an input pattern adapter for executing adaptation of the input pattern based on (i) the input pattern, (ii) the top N candidates as a result of preliminary recognition, and (iii) the reference patterns;

a reference pattern adapter for:
  (a) executing adaptation of the reference patterns by reading out (i) the input pattern, (ii) the top N candidates as a result of preliminary recognitions and (iii) the reference patterns, and
  (b) storing the adapted reference patterns in the reference pattern memory;

a final recognizer for:
  (a) receiving (i) the adapted input pattern, (ii) the top N candidates as a result of preliminary recognition, and (iii) the reference patterns corresponding to the top N candidates, and
  (b) executing matching for the recognition; and a reference pattern adapter for:
  (a) executing the adaptation by reading out (i) the result of recognition in the final or second recognizer, (ii) the input pattern, and (iii) the reference patterns, and
  (b) storing the adapted reference patterns in the reference pattern memory to be ready for the next input.

17. A speech recognition system comprising:

an analyzer for converting a speech signal input into feature vector series;

an input pattern memory for storing the feature vector series as an input pattern;

a reference pattern memory for storing reference patterns;

a preliminary recognizer for executing a preliminary recognition based on (i) the input pattern and (ii) all reference patterns read out from the reference pattern memory to obtain top N candidates in an order of higher similarities;

an input pattern adapter for executing an adaptation of the input pattern based on (i) the input pattern, (ii) the top N candidates as a result of preliminary recognition, and (iii) the reference patterns;

a reference pattern adapter for:
  (a) reading out (i) the input pattern, (ii) the top N candidates as a result of preliminary recognitions and (iii) the reference patterns, and
  (b) executing adaptation of the reference patterns based on (i) the input pattern, (ii) the top N candidates, and (iii) the reference patterns, and
  (c) storing the adapted reference patterns in the reference pattern memory;

a final recognizer for:
  (a) receiving (i) the adapted input pattern, (ii) the top N candidates as a result of preliminary recognition, and (iii) the reference patterns corresponding to the top N candidates, and
  (b) executing matching for the recognition;

a confirmer for:
  (a) receiving the final or second recognition result and a confirmation result for the recognition result in the final or second recognizer,
  (b) correcting the final or second recognition result if the final or second recognition result is wrong, and
  (c) outputting the correct recognition result; and a reference pattern adapter for:
  (a) executing the adaptation of the reference patterns once again by reading out (i) the correct recognition result, (ii) the input pattern, and (iii) the reference patterns, and
  (b) storing the once-again adapted reference patterns in the reference pattern memory to be ready for the next input.

* * * * *